United States Patent
Konietzko

(10) Patent No.: US 10,561,999 B2
(45) Date of Patent: Feb. 18, 2020

(54) PHARMACY FORMULATION PRODUCTION JAR LID, JAR BOTTOM, JAR ADAPTER, JAR, LIFTING ARM, AND PHARMACY FORMULATION DEVICE

(71) Applicant: GAKO INTERNATIONAL GMBH, München (DE)

(72) Inventor: Matthias Konietzko, Bamberg (DE)

(73) Assignee: GAKO INTERNATIONAL GMBH, München (DE)

( * ) Notice: Subject to any disclaimer, the term of this patent is extended or adjusted under 35 U.S.C. 154(b) by 45 days.

(21) Appl. No.: 15/753,502

(22) PCT Filed: Aug. 17, 2016

(86) PCT No.: PCT/EP2016/069509
§ 371 (c)(1),
(2) Date: Feb. 19, 2018

(87) PCT Pub. No.: WO2017/029322
PCT Pub. Date: Feb. 23, 2017

(65) Prior Publication Data
US 2018/0243705 A1    Aug. 30, 2018

(30) Foreign Application Priority Data

Aug. 20, 2015   (DE) .................. 10 2015 113 822

(51) Int. Cl.
*B01F 15/00* (2006.01)
*A61J 3/00* (2006.01)
(Continued)

(52) U.S. Cl.
CPC .......... *B01F 15/00733* (2013.01); *A61J 3/00* (2013.01); *B01F 7/161* (2013.01);
(Continued)

(58) Field of Classification Search
CPC ........ A61J 3/00; A61J 3/04; A61J 3/07; B01F 11/0054; B01F 15/00733; B01F 15/00805;
(Continued)

(56) References Cited

U.S. PATENT DOCUMENTS 1,233,823 A * 7/1917 Tiger ..................... B01F 13/04
                                                    248/229.14
1,412,401 A * 4/1922 Gotfredsen .......... A47J 43/044
                                                    366/251
(Continued)

FOREIGN PATENT DOCUMENTS

DE       19735539 A1    2/1999
DE       29724902 U1    8/2005
(Continued)

OTHER PUBLICATIONS

International Search Report for PCT/EP2016/069509 dated Oct. 20, 2016.

*Primary Examiner* — Tony G Soohoo
(74) *Attorney, Agent, or Firm* — Bachman & LaPointe, P.C.

(57) ABSTRACT

A pharmacy formulation preparation crock lid (34) or pharmacy formulation preparation crock bottom of a pharmacy formulation preparation crock (31) for preparing an individual pharmaceutical product in a pharmacy, wherein the pharmacy formulation preparation crock lid (34) or pharmacy formulation preparation crock bottom is adapted for quick and detachable screw-fastening to a pharmacy formulation preparation device lifting arm (56) for a pharmacy formulation preparation device (2) for preparing an individual pharmaceutical product, comprising: a lid plate (35) or a bottom plate, respectively; wherein the lid plate (35) or the bottom plate, respectively, comprises a substantially cylindrical fastening extension (36), hollow on the inside, (Continued)

extending from the lid plate (35) upwards or from the bottom plate downwards, respectively, and allowing access to the region of the pharmacy formulation preparation crock (31) located below the lid plate (35) or above the bottom plate, respectively, for detachably fastening the pharmacy formulation preparation crock lid (34) to a lifting arm of the pharmacy formulation preparation device (2); and wherein the fastening extension (36) comprises on its outer surface (84) at least two outer thread regions (54) spaced apart from one another in the circumferential direction.

21 Claims, 13 Drawing Sheets

(51) Int. Cl.
  *B01F 7/16* (2006.01)
  *A61J 3/04* (2006.01)
  *A61J 3/07* (2006.01)
(52) U.S. Cl.
  CPC ........... *B01F 15/00805* (2013.01); *A61J 3/04* (2013.01); *A61J 3/07* (2013.01); *B01F 2215/0032* (2013.01)
(58) Field of Classification Search
  CPC . B01F 2215/0032; B01F 7/161; F16B 37/085
  See application file for complete search history.

(56) References Cited

U.S. PATENT DOCUMENTS

| | | | | |
|---|---|---|---|---|
| 1,496,611 A * | 6/1924 | Siegel | ................... | A47J 43/044 366/207 |
| 1,598,399 A * | 8/1926 | Simmonds | ............. | B01F 7/161 212/292 |
| 2,828,662 A * | 4/1958 | Antal | ................... | F16B 37/085 269/181 |
| 3,073,577 A * | 1/1963 | Stevenson | ............... | B01F 7/161 366/258 |
| 4,278,005 A * | 7/1981 | Lachner | ................... | F16B 31/04 411/337 |
| 4,418,583 A * | 12/1983 | Taig | ........................ | F16C 1/105 192/111.11 |
| 4,661,029 A * | 4/1987 | Miller | ................... | B23B 31/113 279/50 |
| 4,738,542 A * | 4/1988 | Hung | ................... | A47J 43/044 366/244 |
| 4,781,507 A * | 11/1988 | Duenas | ..................... | B25B 5/10 269/185 |
| 5,439,289 A * | 8/1995 | Neilson | .................. | A23G 9/045 366/206 |
| 6,976,609 B2 * | 12/2005 | Konietzko | ......... | B65D 83/0005 222/334 |
| 7,293,936 B1 * | 11/2007 | Warren | ................. | F16B 37/085 124/23.1 |
| 7,682,120 B1 * | 3/2010 | Goldbaum | ............ | F16B 39/122 411/418 |
| 8,337,074 B2 * | 12/2012 | Wild | .................... | B01J 19/0066 366/249 |
| 8,960,999 B1 * | 2/2015 | Ochoa | ................... | A47J 43/044 366/207 |
| 9,131,806 B1 * | 9/2015 | Ochoa | ................... | A47J 43/044 |
| 10,154,758 B2 * | 12/2018 | Ochoa | ................... | A47J 43/044 |
| 10,182,682 B2 * | 1/2019 | Ochoa | ................... | A47J 43/044 |
| 2002/0154568 A1 | 10/2002 | Renfro | | |
| 2004/0057811 A1 | 3/2004 | Kelzer | | |
| 2018/0243703 A1 * | 8/2018 | Konietzko | .......... | B01F 11/0054 |
| 2018/0243705 A1 * | 8/2018 | Konietzko | ................ | A61J 3/00 |

FOREIGN PATENT DOCUMENTS

| | | |
|---|---|---|
| DE | 102010044227 A1 | 3/2012 |
| DE | 102012110986 A1 | 5/2013 |

* cited by examiner

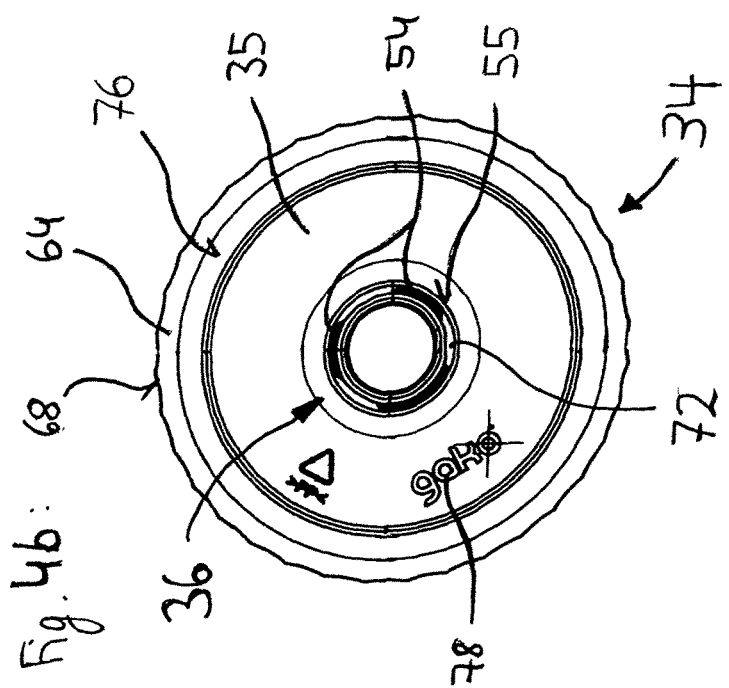
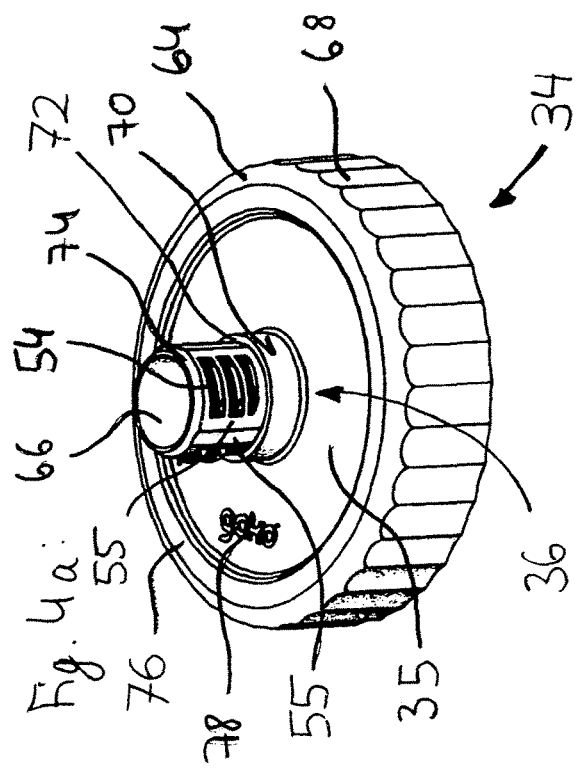
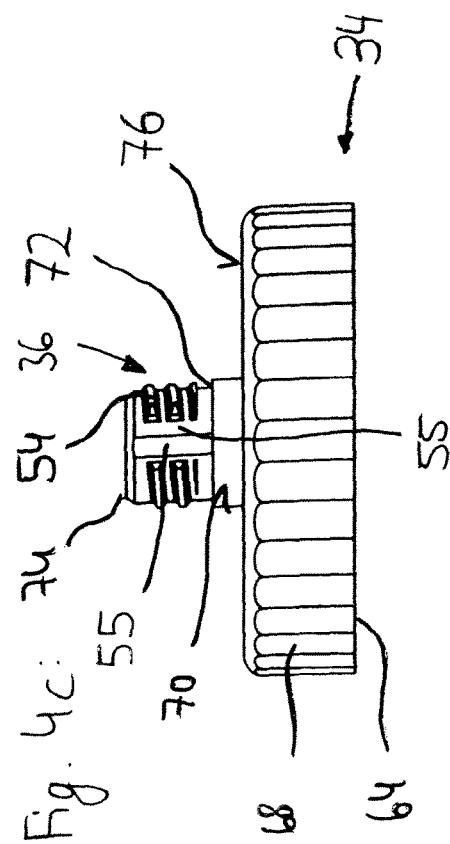

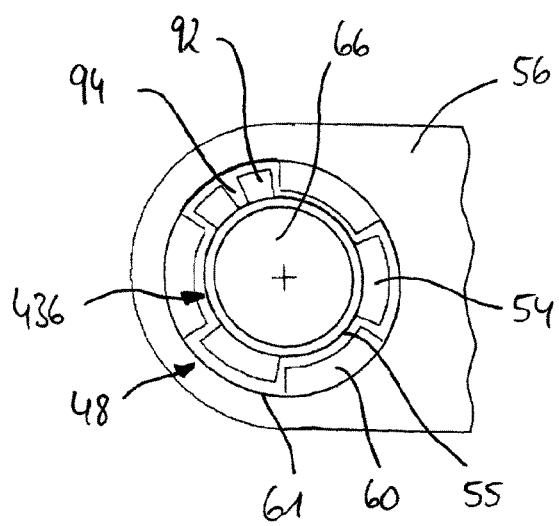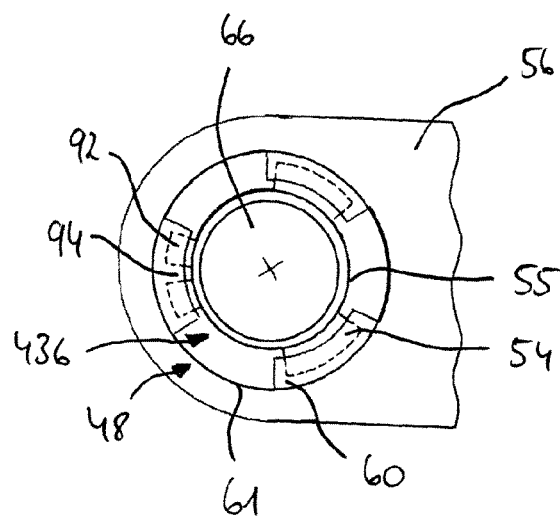

PHARMACY FORMULATION PRODUCTION JAR LID, JAR BOTTOM, JAR ADAPTER, JAR, LIFTING ARM, AND PHARMACY FORMULATION DEVICE

BACKGROUND

The invention relates to a pharmacy formulation preparation crock lid, a pharmacy formulation preparation crock bottom, a corresponding pharmacy formulation preparation crock adapter, a corresponding pharmacy formulation preparation crock, a corresponding pharmacy formulation preparation device lifting arm and a corresponding pharmacy formulation preparation device.

A device for agitating and preparing mixtures or the like in an agitating vessel is known from the German utility model DE 277 24 902 U1. Even though this device has proven to be suitable for everyday pharmacy use for preparing individual pharmaceutical products, the inventor of the present subject matter has recognized that the handling of crocks for such devices is cumbersome and time-consuming.

SUMMARY

It is therefore an object of the present invention to specify a pharmacy formulation preparation crock and components for it, a pharmacy formulation preparation device lifting arm and a pharmacy formulation preparation device for it, which allow for easier and faster handling. In particular, the invention aims to achieve easy and quick attaching of the pharmacy formulation preparation crock to the pharmacy formulation preparation device lifting arm and also easy and quick detaching of the pharmacy formulation preparation crock from the pharmacy formulation preparation device lifting arm.

This object is achieved by the subject matter of the independent patent claims. Advantageous further embodiments result from the dependent claims.

An inventive pharmacy formulation preparation crock lid or pharmacy formulation preparation crock bottom of a pharmacy formulation preparation crock for preparing an individual pharmaceutical product in a pharmacy is adapted for quick and detachable screw-fastening to a pharmacy formulation preparation device lifting arm for a pharmacy formulation preparation device for preparing an individual pharmaceutical product and comprises a lid plate or a bottom plate, respectively, wherein the lid plate or the bottom plate, respectively, comprises a substantially cylindrical fastening extension, hollow on the inside, extending from the lid plate upwards or from the bottom plate downwards, respectively, and allowing access to the region of the pharmacy formulation preparation crock located below the lid plate or above the bottom plate, respectively, for detachably fastening the pharmacy formulation preparation crock lid to a lifting arm of the pharmacy formulation preparation device, and wherein the fastening extension comprises at its outer surface at least two outer thread regions spaced apart from one another in the circumferential direction.

An inventive pharmacy formulation preparation device lifting arm for a pharmacy formulation preparation device for preparing an individual pharmaceutical product is adapted for quickly and detachably screw-fastening a pharmacy formulation preparation device of the above-described type, a pharmacy formulation preparation crock bottom of the above-described type, a pharmacy formulation preparation crock adapter of the above-described type or a pharmacy formulation preparation crock of the type described below, and comprises a substantially longitudinal basic body having a crock fastening extension fastening region for a fastening extension of a pharmacy formulation preparation crock lid, a pharmacy formulation preparation crock bottom, a pharmacy formulation preparation crock adapter or a pharmacy formulation preparation crock provided at or close to the longitudinal front end of the basic body;

wherein the crock fastening extension fastening region is adapted as a recess extending from the lower side to the upper side of the basic body; and wherein the crock fastening extension fastening region comprises on its inner surface at least two inner thread regions spaced apart from one another in the circumferential direction.

According to findings underlying the invention, the handling of conventional pharmacy formulation preparation crocks on conventional pharmacy formulation preparation devices is cumbersome and time-consuming, because the crocks, which already contain the components to be mixed and are therefore heavy, are fastened to the lifting arm by screwing their threads into the thread of the lifting arm over a very long screwing path. This requires a significant amount of force and a relatively long time for the fastening process. The same applies for detaching the pharmacy formulation preparation crock after preparing the individual pharmaceutical product, in particular after the mixing procedure. In addition, a problem often occurs in that the pharmacy formulation preparation crock gets jammed when screwing it into the lifting arm, thereby further extending the time required for the fastening process and, in the worst case, even damaging the thread.

According to a basic principle of the present invention—in a pharmacy formulation preparation crock lid or a pharmacy formulation preparation crock bottom—the fastening extension of the pharmacy formulation preparation crock, or—in a pharmacy formulation preparation crock adapter—the basic body, has at least two outer thread regions spaced apart from one another in the circumferential direction, and the pharmacy formulation preparation device lifting arm has, on the inner surface of its crock fastening extension fastening region, at least two inner thread regions spaced apart from one another in the circumferential direction.

The inventive pharmacy formulation preparation device lifting arm may be formed integrally. In the integral form, the crock fastening extension fastening region is an integral part of the pharmacy formulation preparation device lifting arm.

The inventive pharmacy formulation preparation device lifting arm may also be formed in two parts. In the two-part version, the pharmacy formulation preparation device lifting arm comprises a recess having an insert mounted therein or being mountable thereto at or close to the longitudinal front end of the basic body, the recess comprising the inventive crock fastening extension fastening region. The insert is positioned and fixed within the cylindrical recess in a clamping, screwing manner, resting on a stopping surface provided in the lower region of the recess, or in any other way.

The pharmacy formulation preparation crock may therefore, in the vertical direction, be slid into the crock fastening extension fastening region, that means in a rotary position, in which the outer thread regions of the pharmacy formulation preparation crock, or the crock lid, the crock bottom or the crock adapter, are positioned at the threadless intermediate regions between the inner thread regions of the crock fastening extension fastening region, whereafter the actual fastening process can be performed, in which the pharmacy formulation preparation crock is rotated along a rotation path until its outer thread regions engage with the inner thread regions of the crock fastening extension fastening region. This rotation path is 90° or less, depending on how many outer thread regions and inner thread regions are provided spaced apart from one another in the circumferential direction, and depending on which circumferential angle area these outer thread regions and inner thread regions extend over. In each case, the rotation path is significantly shorter than the rotation path in conventional continuous threads, in which it is often necessary to perform several full spins of 360° before the pharmacy formulation preparation crock is finally reliably fixed with respect to the lifting arm.

This allows for quickly fastening an inventive pharmacy formulation preparation crock to an inventive lifting arm and analogously detaching it quickly. It requires less force for rotating, lifting and holding the pharmacy formulation preparation crock than with conventional crocks and lifting arms.

In addition, the fact that the pharmacy formulation preparation crock, in particular the crock lid, the crock bottom or the crock adapter, is first inserted into the lifting arm or in its crock fastening extension fastening region in the vertical direction, in particular up to a stopper, and the rotational movement is performed only afterwards, significantly reduces the risk of jamming, which also saves time and reduces the wearing-down of the threads.

The term crock refers to a type of mixing vessel specifically used for the preparation of individual pharmaceutical products in pharmacies. Such individual pharmaceutical products may be ointments, semisolid preparations, pastes, creams, gels, emulsions, eye drops, tinctures, pills, capsules or teas. Typically, such crocks have no neck or do not narrow in any way on the upper side, but rather have a cylindrical interior space such that the individual pharmaceutical products prepared therein can easily be completely taken out, for example using a spatula.

There are different basic crocks forms.

In a first basic crock form, the crock comprises a cylindrical basic body, in whose lower end a movable bottom is arranged for pressing the individual product out and which separates the inner region of the cylindrical basic body from the outer region and comprises, on its opposite upper end, a fastening extension for a pharmacy formulation preparation crock lid of the type described herein.

In a second basic crock form, the crock comprises a cylindrical basic body, on whose lower end a fastening extension for a pharmacy formulation preparation crock bottom of the type described herein is arranged and which comprises on the opposite upper end, a lid plate fixedly connected to the cylindrical basic body and having a removal opening, which can be closed with a separate lid. The pharmacy formulation preparation crock bottom may, after preparing the individual product, be detached from the cylindrical basic body and exchanged with a bottom that is displaceable in the axial direction.

One difference between these two basic crock forms is that in the first basic crock form, the ingredients for the individual product to be prepared are added from above through the upper opening of the crock after screwing off the crock lid, whereas in the second basic crock form, the ingredients for the individual product to be prepared are added through the lower opening after screwing off the crock bottom and after turning the crock upside down, such that its bottom opening faces upwards.

According to another difference between the two basic crock forms, in the first basic crock form, the lid can be taken off, as otherwise the ingredients could not or only with difficulty be added through the upper opening of the crock, whereas in the second basic crock form, in which the ingredients are added through the bottom opening, the lid plate is integrally connected to the cylindrical wall of the basic body and comprises a removal opening which can be closed and opened by means of an additional lid.

In the first basic crock form, the crock fastening extension is arranged on the upper side of the crock and forms part of the crock lid, whereas in the second basic crock form, the crock fastening extension is arranged on the lower side of the crock and forms part of the crock bottom.

In both basic crock forms, the already prepared individual product is removed through the upper side of the crock. In the first basic crock form, the individual product is removed through the fastening extension, which is part of the removable crock lid, and in the second basic crock form, the individual product is removed through the removal opening within the lid plate provided integrally with the cylindrical basic body.

In both cases, the crock bottom is displaced towards the upper side of the crock; in the first basic crock form, towards the fastening extension, and in the second basic crock form, towards the removal opening, and the individual product is thus pressed out in a tube-type manner.

In an inventive pharmacy formulation preparation crock having an inventive pharmacy formulation preparation crock, the crock lid fastening to the lifting arm is as follows:

First, the ingredients of the individual product are filled into the pharmacy formulation preparation crock in their respective composition. Afterwards, an agitating tool, connected to an agitating stick, is inserted into the pharmacy formulation preparation crock and may rest on top of the ingredients or be immersed therein. Next, the agitating stick, not yet connected to the agitating unit, is guided through the fastening extension of the pharmacy formulation preparation crock lid and the crock lid is guided to the crock container and plugged or screwed thereon or fastened thereto in any other way. The overall arrangement consisting of the pharmacy formulation preparation crock container, the pharmacy formulation preparation crock lid, the agitating tool and the agitating stick is then, in the vertical direction, inserted into the crock fastening extension fastening region of the lifting arm in a rotary position, in which the outer thread regions are arranged flush with the threadless inner thread intermediate regions of the crock fastening extension fastening region of the pharmacy formulation preparation device lifting arm. Afterwards, the agitating stick snaps into the top of the agitating unit of the pharmacy formulation preparation device. At the same time or subsequently, the actual fastening process is performed by rotating the pharmacy formulation preparation crock along a rotation path until its outer thread regions engage the inner thread regions of the crock fastening extension fastening region. This rotation path is 90° or less, depending on how many outer thread regions and inner thread regions are provided spaced apart from one another in the circumferential direction and depending on which circumferential angle these outer thread regions and inner thread regions extend over.

When fastening a pharmacy formulation preparation crock having a pharmacy formulation preparation crock bottom of a crock having the second basic crock form to the lifting arm, a similar process is performed. The crock is to be used. The crock container is placed on the removal opening and a cap is connected to this opening. The ingredients of the individual product are filled into the crock container and the agitating tool connected to the agitating stick is inserted into the pharmacy formulation preparation crock container and may rest on the ingredients or be immersed therein. Next, the agitating stick, not yet connected to the agitating unit, is guided through the fastening extension of the pharmacy formulation preparation crock bottom, and the crock bottom is guided to the crock container and inserted or screwed thereon or fastened thereto in any other way. The overall arrangement consisting of the pharmacy formulation preparation crock container, the pharmacy formulation preparation crock bottom, the agitating tool and the agitating stick is then, in the vertical direction, inserted into the crock fastening extension fastening region of the lifting arm in a rotary position, in which the outer thread regions are arranged flush with the threadless inner thread intermediate regions of the crock fastening extension fastening region of the pharmacy formulation preparation device lifting arm. Afterwards, the agitating stick snaps into the top of the agitating unit of the pharmacy formulation preparation device. At the same time or subsequently, the actual fastening process is performed by rotating the pharmacy formulation preparation crock along a rotation path until its outer thread regions engage the inner thread regions of the crock fastening extension fastening region. This rotation path is 90° or less, depending on how many outer thread regions and inner thread regions are provided spaced apart from one another in the circumferential direction and depending on which circumferential angle these outer thread regions and inner thread regions extend over. Subsequently, the crock is detached from the pharmacy formulation preparation device lifting arm along a rotation path having an opposite rotational direction than the one for attaching it. The crock bottom position positioned on top is detached from the crock container, and the agitating tool, together with the agitating stick, is removed from the crock container. Subsequently, a movable crock bottom is inserted into the crock container in place of the inventive crock bottom. After the crock has now been rotated into an upright position, in which the removal opening is facing upwards, the individual product can be taken out of the crock using the crock bottom.

When using the inventive pharmacy formulation preparation crock adapter, a conventional crock container is first filled with ingredients of the individual product. Then, the agitating tool, together with the agitating stick, is inserted into the crock container and may rest on the ingredients or be immersed therein. Next, the agitating stick is guided through the fastening extension of a conventional pharmacy formulation preparation crock lid and the crock lid is guided onto the crock container in a horizontal direction and plugged onto the or screwed onto the crock container or fixed thereto in any other way. The crock adapter may be screwed onto the fastening extension of the crock lid before or after. If the crock adapter is screwed onto the fastening extension before guiding the agitating stick through the fastening extension, the agitating stick does not need to be subsequently guided through the crock adapter again. The overall arrangement consisting of the crock container, the crock lid having the pharmacy formulation preparation screwed onto its fastening extension, the agitating tool and the agitating stick, is then, in the vertical direction, inserted into the inventive pharmacy formulation preparation device lifting arm, such that the outer thread regions are arranged flush with the threadless inner thread intermediate regions of the crock fastening extension fastening region, and then the crock adapter with the crock is, along a rotation path about a rotation angle of 90° or less, quickly fastened to the crock fastening extension fastening region, such that the outer thread regions of the crock adapter engage the inner thread regions of the crock fastening extension fastening region.

Detaching the pharmacy formulation preparation crock from the pharmacy formulation preparation device lifting arm is performed in the order opposite to the order of fastening the pharmacy formulation preparation crock.

The lid plate or the bottom plate, respectively, comprises a substantially cylindrical fastening extension, hollow on the inside, extending from the lid plate upwards or from the bottom plate downwards, respectively, and allowing access to the region of the pharmacy formulation preparation crock located below the lid plate or above the bottom plate, respectively, for detachably fastening the crock lid to the lifting arm of the pharmacy formulation preparation device. Outer thread regions are arranged at this fastening extension, which allow for a quick and easy attachment of the pharmacy formulation preparation crocks to a pharmacy formulation preparation device lifting arm of a pharmacy formulation preparation device.

According to a first embodiment of the pharmacy formulation preparation crock lid, pharmacy formulation preparation crock bottom or pharmacy formulation preparation crock adapter, the outer thread regions each comprise a plurality of thread walls, in particular 2 to 10, arranged in the axial direction equidistantly on top of one another with the same inclination. The plurality of thread walls arranged on top of one another allow for the crock lid, the crock bottom or the crock adapter to be securely fastened to the crock fastening extension fastening region of the lifting arm, wherein two thread walls are already sufficient for a sufficiently secure fastening within the crock fastening extension fastening region of the inventive lifting arm.

For the sake of a better understanding, in the following, the terms crock lid, crock bottom and crock adapter are used as short forms for the terms pharmacy formulation preparation crock lid, pharmacy formulation preparation crock bottom and pharmacy formulation preparation crock adapter.

According to another embodiment of the crock lid or the crock bottom, a threadless outer surface intermediate region is arranged between two outer thread regions spaced apart from one another in the circumferential direction. These outer surface intermediate regions have, in a radial direction, a smaller distance from the center axis than the outer thread regions. This makes it possible to quickly insert the corresponding inner thread region of the crock fastening extension fastening region of the inventive lifting arm, in particular in the vertical direction, and subsequently screw it in.

According to another embodiment, the crock lid, or the crock bottom, further comprises three outer thread regions spaced apart from one another in the circumferential direction having threadless outer surface intermediate regions arranged therebetween. This embodiment allows for an especially easy and fast fastening process with only a short rotation path.

According to another embodiment of the crock lid or the crock bottom, the outer thread regions each take up an angle area of 10 to 90°, in particular 50 to 70°. This embodiment also allows for an especially fast and easy fastening process with only a short rotation path.

According to another embodiment of the crock lid or the crock bottom, at least one of the outer thread regions comprises at least one circumferentially centered outer thread region section and two outer thread region sections circumferentially adjoining them on both sides in the circumferential direction. The center outer thread region allows for the outer thread region to securely engage with the inner thread region of the crock fastening extension fastening region, and the outer thread region sections allow for an inner thread region of the crock fastening extension fastening region to be easily moved past them.

According to another embodiment of the crock lid or the crock bottom, at least one thread wall has, in the circumferentially centered outer thread region section, a continuous height, measured radially to the curved plane of the outer surface of the fastening extension or to the thread bottom. This guarantees for an especially secure engagement of the center outer thread region section into the corresponding inner thread region of the crock fastening extension fastening region of the inventive lifting arm.

According to another embodiment of the crock lid or the crock bottom, the height of the thread walls in the circumferentially outer thread region sections, decreases, measured radially to the curved plane of the outer surface of the fastening extension or to the thread bottom, from the circumferentially inner end facing the center outer thread region section towards the circumferentially outer end of the respective outer outer thread region section, and in particular decreases such that the circumferentially outer end of the respective outer thread region section transitions into the curved plane of the outer surface of the fastening extension, and/or the height thereof, measured radially to the curved plane of the outer surface of the fastening extension, is zero.

Therefore, the outer thread regions can easily and securely be brought into engagement with the respective corresponding inner thread regions of the crock fastening extension fastening region of the inventive lifting arm are, to a great extent, prevented from getting jammed.

According to another embodiment of the crock lid or the crock bottom, one of the outer thread regions, in particular all outer thread regions, comprise at least one thread wall having a continuous height, measured radially to the curved plane of the outer surface of the fastening extension or the thread bottom. All thread walls of one or all outer thread regions may of course also have a continuous height measured radially to the curved plane of the outer surface of the fastening extension or to the thread bottom. This embodiment allows for especially secure fastening.

According to another embodiment of the crock lid or the crock bottom, one outer thread region is adapted as a pair of two outer thread region segments interrupted in the circumferential direction.

According to another embodiment of the crock lid or the crock bottom, the threadless outer surface intermediate regions are adapted in the shape of cylinder segments or have a curved shape, as viewed in a radial cross-section, or the threadless outer surface intermediate regions each form a plane extending parallel to the longitudinal axis of the fastening extension, which plane connects the circumferentially outer ends of respectively neighboring outer thread regions. This allows for the crock lid or the crock bottom with the crock fastening extension fastening region of the pharmacy formulation preparation device lifting arm to be easily inserted without getting jammed, in particular in the vertical direction.

According to another embodiment of the crock lid or the crock bottom, the outer thread regions are, viewed in the circumferential direction, each arranged equidistantly with respect to each other and each take up angle regions of equal size, or one outer thread region takes up, viewed in the circumferential direction, a smaller angle area than at least one further outer thread region. This embodiment allows for an especially simple and fast fastening process with only a short rotation path.

According to another embodiment, the crock lid, or the crock bottom, further comprises a positioning marker on the upper side of the lid plate, or on the lower side of the bottom plate, for specifying the rotational insertion position of the pharmacy formulation preparation crock lid or the pharmacy formulation preparation crock bottom with respect to a pharmacy formulation preparation device lifting arm. This positioning marker ensures that the fastening extensions can easily and quickly be inserted into the crock fastening extension fastening region of the lifting arm in the correct rotational insertion position.

According to another embodiment, the crock lid, or the crock bottom, further comprises a circumferential lid edge extending downwards from the lid plate and having an inner thread for being screw-fastened to a pharmacy formulation preparation crock container, or a circumferential bottom edge extending upwards from the bottom plate and having an inner thread for being screw-fastened to a pharmacy formulation preparation crock container. Therefore, the crock lid, in the first basic crock form, or the crock bottom, in the second basic crock form, can be attached and detached quickly and securely to/from the crock container.

According to another embodiment of the crock lid or the crock bottom, the lid plate edge or the bottom plate edge, respectively, comprises an elevation. This lid plate edge or bottom plate edge forms a stopping surface for the lower side of the lifting arm. When the lid plate edge or the bottom plate edge stops at the lower side of the lifting arm, the final fastening position is reached.

According to another embodiment of the crock lid or the crock bottom, the lid plate or the bottom plate comprises at least one positioning elevation extending radially outwards from the fastening extension, which rises in the vertical direction from the lid plate or the bottom plate along the extension direction of the fastening extension. The positioning elevation is arranged close to an outer thread region of the fastening extension. When detaching the crock from a crock fastening extension fastening region, the positioning elevation abuts a removal position indication pin of a pharmacy formulation preparation device lifting arm and thereby indicates to the user that the outer thread regions are no longer engaging with the inner thread regions, and that the crock can be taken out of the crock fastening extension fastening region without being obstructed. This allows for an especially user-friendly detachment of the crock.

According to another embodiment, the lid edge comprises a profile on the radial outer side of the inventive crock lid, allowing the user an especially good grip on the lid and quickly screwing and detaching the crock lid onto the and from the crock container.

According to another advantageous embodiment of the crock lid, the fastening extension comprises an upper substantially cylindrical fastening region and a lower substantially cylindrical base region having a larger diameter, wherein a transition between the lower base region and the upper fastening region comprises a stopping face, in particular of an annular shape, facing upwards, which forms a stopper for a stopping surface of a crock fastening extension fastening region, and/or wherein the upper crock fastening extension fastening region comprises at its outer surface at least two outer thread regions spaced apart from one another in the circumferential direction. This stopping surface defines the final fastening position in the vertical direction.

According to another advantageous embodiment of the crock lid, the upper substantially cylindrical fastening region comprises, on its upwards-facing side, a stopping face, in particular of an annular shape, which forms a stopper for a screw-in limiting surface of a screw-in limiting region of a crock fastening extension fastening region. The screw-in limiting surface defines the final fastening position in the vertical direction.

According to another advantageous embodiment of the crock bottom, the fastening extension comprises a lower substantially cylindrical fastening region and an upper substantially cylindrical base region having a larger diameter, wherein at the transition between the upper base region and the lower fastening region, a stopping face, in particular of an annular shape, facing downwards, is formed, which forms a stopper for a stopping surface of a crock fastening extension fastening region, and/or wherein the lower fastening region comprises, on its outer surface, at least two outer thread regions spaced apart from one another in the circumferential direction. The stopping surface defines the final fastening position in the vertical direction.

According to another embodiment of the crock lid, the lower substantially cylindrical fastening region comprises, on its side facing down, a stopping face, in particular of an annular shape, which forms a stopper for a screw-in limiting surface of a screw-in limiting region of a crock fastening extension fastening region. This stopping surface defines the final fastening position in the vertical direction.

The invention also relates to a pharmacy formulation preparation crock adapter for quickly and detachably screw-fastening a pharmacy formulation preparation crock lid or a pharmacy formulation preparation crock bottom of a pharmacy formulation preparation crock to a pharmacy formulation preparation device lifting arm for a pharmacy formulation preparation device for preparing an individual pharmaceutical product. The inventive pharmacy formulation preparation crock adapter comprises a substantially cylindrical basic body;

having an inner thread for being screw-fastened to a fastening extension of a pharmacy formulation preparation crock lid, or a pharmacy formulation preparation crock bottom, of a pharmacy formulation preparation crock; and having on its outer surface at least two outer thread regions spaced apart from one another in the circumferential direction.

The advantages and embodiments as well as the findings and principal ideas underlying the invention described above with reference to the pharmacy formulation preparation crock lid and the pharmacy formulation preparation crock bottom also apply to the inventive pharmacy formulation preparation crock adapter and are not repeated at this point. The applicant explicitly reserves the right to formulate corresponding dependents claims.

With such an inventive pharmacy formulation preparation crock adapter, conventional crocks can be provided with a quick-fastening means such as to be fixed to an inventive lifting arm. The pharmacy formulation preparation crock adapter is, with its inner thread, screwed onto the fastening extension of a conventional crock.

The invention also relates to an inventive pharmacy formulation preparation crock comprising:

a pharmacy formulation preparation crock container having a cylindrical body and a bottom plate; and a pharmacy formulation preparation crock lid of the above type, which is fastened to the pharmacy formulation preparation crock container, in particular screwed thereon.

This crock has in particular the above-described first basic crock form. The advantages and embodiments as well as the findings and principal ideas underlying the invention described above with reference to the pharmacy formulation preparation crock lid also apply to the inventive pharmacy formulation preparation crock and are not repeated at this point. The applicant explicitly reserves the right to formulate corresponding dependents claims.

Reference is made to the structural features of the above-described first basic crock form and these are not repeated at this point. The applicant explicitly reserves the right to formulate corresponding dependents claims.

The invention further relates to an inventive pharmacy formulation preparation crock comprising the following:

a pharmacy formulation preparation crock container having a cylindrical body and a lid plate; and a pharmacy formulation preparation crock bottom of the above type, which is fastened to the pharmacy formulation preparation crock container, in particular screwed thereon.

This crock has, in particular, the above-described second basic crock form. The advantages and embodiments as well as the findings and principal ideas underlying the invention described above with reference to the pharmacy formulation preparation crock lid also apply to the inventive pharmacy formulation preparation crock and are not repeated at this point. The applicant explicitly reserves the right to formulate corresponding dependents claims.

Reference is made to the structural features of the above-described second basic crock form and these are not repeated at this point. The applicant explicitly reserves the right to formulate corresponding dependents claims.

The invention further relates to an inventive pharmacy formulation preparation crock comprising the following:

a pharmacy formulation preparation crock container having a cylindrical body and a lid plate or a bottom plate;

a lid plate or a bottom plate, respectively, comprising a substantially cylindrical fastening extension, hollow on the inside, extending from the lid plate of the crock lid upwards or from the bottom plate of the crock lid downwards, respectively, and allowing access to the region of the pharmacy formulation preparation crock arranged below the lid plate or above the bottom plate, respectively, having a continuous outer thread for detachable fastening to a lifting arm of the pharmacy formulation preparation device, and a pharmacy formulation preparation crock adapter of the above type, which is, with its inner thread, screwed onto the continuous outer thread of the crock lid or the crock bottom.

Therefore, a conventional crock can be provided with a quick-fastening means using an inventive pharmacy formulation preparation crock adapter.

The advantages and embodiments as well as the findings and principal ideas underlying the invention described above with reference to the pharmacy formulation preparation adapter also apply to the inventive pharmacy formulation preparation crock and are not repeated at this point.

According to a first embodiment of the pharmacy formulation preparation device lifting arm, the inner thread regions each comprise a plurality of thread walls, in particular 2 to 10, being, in the axial direction, equidistantly arranged on top of one another with the same inclination. The plurality of thread walls arranged on top of one another allow for the crock lid, the crock bottom or the crock adapter to be securely fastened to the crock fastening extension fastening region of the lifting arm, wherein two thread walls are already sufficient for a sufficiently secure fastening within the crock fastening extension fastening region of the inventive lifting arm.

For a better understanding, the term lifting arm is in the following used as a short form of pharmacy formulation preparation device lifting arm.

According to another embodiment of the lifting arm, the crock fastening extension fastening region comprises a substantially cylindrical shape.

According to another embodiment of the lifting arm, the lifting arm comprises on its lower side a removal position indication pin extending from the lower side of the lifting arm, in particular up to 4 mm, downwards in the vertical direction. The removal position indication pin is provided radially outside the crock fastening extension fastening region such that, during the process of quick-fastening the crock lid in the crock fastening extension fastening region, the removal position indication pin is arranged between the lid plate of the crock lid or the bottom plate of the crock bottom and the lower side of the lifting arm. When detaching the crock from a crock fastening extension fastening region, the positioning elevation abuts the removal position indication pin of the pharmacy formulation preparation device lifting arm and thereby indicates to the user that the outer thread regions are no longer engaging the inner thread regions, and that the crock can be taken out of the crock fastening extension fastening region without being obstructed. This allows for an especially user-friendly detachment of the crock.

The removal position indication pin and the positioning elevation prevent, when the crock lid, or the crock bottom, is detached from the crock fastening extension fastening region of the lifting arm, the outer thread regions of the fastening extension from engaging the inner thread regions, viewed in the rotational direction, closest to them, thereby making it difficult or even prevent the fastening extension from being pulled out of the crock fastening extension fastening region.

According to another embodiment of the lifting arm, the crock fastening extension fastening region comprises an upper substantially cylindrical recess region and a lower substantially cylindrical recess region having a larger diameter, wherein at the transition between the lower and the upper substantially cylindrical recess region, a stopping face, in particular of an annular shape, facing downwards is provided, which forms a stopper for a stopping surface of a fastening extension of the pharmacy formulation preparation crock lid, the pharmacy formulation preparation crock bottom or the pharmacy formulation preparation crock adapter, and/or wherein the upper recess region comprises, on its inner surface, at least two inner thread regions spaced apart from one another in the circumferential direction. This stopping surface defines the final fastening position in the vertical direction. The final fastening position is reached when a crock lid, crock bottom or crock adapter are, first, inserted in the vertical direction in a rotational position, in which the outer thread regions are arranged flush with the threadless inner faces of the crock fastening extension fastening region of the lifting arm, and then rotated in the fastening position, in which the outer thread regions engage the inner thread regions until the stopping surface abuts the stopping surface of the crock fastening extension fastening region.

According to another embodiment, the crock fastening extension fastening region comprises, at the upper end of the upper substantially cylindrical recess region, a screw-in limiting region comprising a smaller inner diameter than the inner diameter of the inner thread region. Thereby, the screw-in limiting region forms a screw-in limiting surface on its lower side towards the lower substantially cylindrical recess region, the screw-in limiting surface forming a stopper for the stopping surface of the fastening extension. This allows for a particularly advantageous fastening possibility for the fastening extension of the crock lid, the crock bottom or the crock adapter in the crock fastening extension fastening region of the lifting arm.

According to another embodiment, the lifting arm further comprises a fastening claw having two claw extensions, the fastening claw comprising the crock fastening extension fastening region and an agitating stick insertion region, which is adapted as a recess extending from the lower side to the upper side of the basic body and extends from the longitudinal front end of the basic body to the crock fastening extension fastening region.

This makes it possible to guide an agitating shaft, which protrudes from the crock container when screwing in a filled pharmacy formulation preparation crock, between the two claw extensions and thereby sliding the pharmacy formulation preparation crock into the inventive lifting arm from the front. Many users feel that inserting the pharmacy formulation preparation crock from the front is easier and more user-friendly.

According to another embodiment of the lifting arm, the recess of the agitating stick insertion region comprises two inner faces facing one another and having a substantially constant distance or distance increasing to the front. In the latter embodiment, the agitating shaft can be inserted into the inventive lifting arm from the front even more easily.

According to another embodiment of the pharmacy formulation preparation device lifting arm, a threadless inner surface intermediate region is arranged between two inner thread regions spaced apart from one another in the circumferential direction. This embodiment allows for an especially simple and quick fastening process with only a short rotation path.

According to another embodiment, the lifting arm comprises three inner thread regions spaced apart from one another in the circumferential direction having threadless inner surface intermediate regions arranged therebetween. This embodiment also allows for an especially simple and quick fastening process with only a short rotation path.

According to another embodiment of the lifting arm, the inner thread regions each take up an angle area of 30 to 90°, in particular 50 to 70°. This embodiment also allows for an especially simple and quick fastening process with only a short rotation path.

According to another embodiment of the lifting arm, at least one of the inner thread regions comprises a circumferentially centered inner thread region section and two outer inner thread region sections circumferentially adjoining them on both sides in the circumferential direction. The center inner thread region allows for the inner thread region to securely engage with the outer thread region of the fastening extension of the crock lid, the crock bottom or the crock adapter, and the outer inner thread region sections allow for an outer thread region of the fastening extension of the crock lid, the crock bottom or the crock adapter to be easily moved past them.

According to another embodiment of the lifting arm, at least one thread wall in the circumferentially centered inner thread region section, has a continuous height, measured radially to the curved plane of the inner surface of the crock fastening extension fastening region or the thread bottom. This guarantees for an especially secure engagement of the center inner thread region section with a corresponding outer thread region of the fastening extension of the crock lid, the crock bottom or the crock adapter.

According to another embodiment of the lifting arm, the height of the thread walls in the circumferentially outer inner thread region sections, decreases, measured radially to the curved plane of the inner surface of the crock fastening extension fastening region or the thread bottom, from the circumferentially inner end facing the center inner thread region section towards the circumferentially outer end of the respective outer inner thread region section and, in particular, decreases such that the circumferentially outer end of the respective outer inner thread region section transitions into the curved plane of the inner surface of the crock fastening extension fastening region, and/or that the height thereof, measured radially to the curved plane of the inner surface of the crock fastening extension fastening region or to the thread bottom, is zero.

Therefore, the inner thread regions can easily and securely be brought into engagement with the respective corresponding outer thread regions of the fastening extension of the crock lid, the crock bottom or the crock adapter and can be, to a great extent, prevented from jamming.

According to another embodiment of the lifting arm, if a fastening claw is provided, a front inner thread region extends at the ends of the crock fastening extension fastening region circumferentially adjacent to the agitating stick insertion region, and these front inner thread regions enclose two threadless inner surface intermediate regions and one rear inner thread region arranged opposite the agitating stick insertion region. This allows for a particularly advantageous fastening possibility for the fastening extension of the crock lid, the crock bottom or the crock adapter in the crock fastening extension fastening region of the lifting arm.

The invention also relates to the combination of a lifting arm and a pharmacy formulation preparation crock screwed, with its fastening extension, into the crock fastening extension fastening region.

In doing so, the upper side of the lid plate, or the lower side of the bottom plate, respectively, of the crock abuts the lower side of the lifting arm. Thereby, the crock is joined with the lifting arm without any space in between, and tilting movements of the crock and damage of the upper side of the crock can thus be avoided.

The invention further relates to an inventive pharmacy formulation preparation device adapted for preparing an individual pharmaceutical product, in particular individual pharmaceutical products such as formulations for ointments, semisolid preparations, pastes, creams, gels, emulsions, eye drops, tinctures, pills, capsules or teas, comprises the following:

a stand unit having a base region and a head region and a center region connecting the base region with the head region, the head region extending over the center region towards the front;

a lifting unit arranged at the center region and being movable upwards and downwards and having a pharmacy formulation preparation device lifting arm of the above type extending, substantially in the horizontal direction, to the front;

an agitating unit arranged within or at the head region, which can be driven by a motor and has an agitating stick extending from the head region downwards and to whose lower end an agitating tool is attached or can be attached; and a control unit adapted such that the agitating unit can be driven by a motor and/or that the lifting unit with the lifting unit fixing pin can be displaced upwards and downwards.

The advantages and embodiments described above with reference to the pharmacy formulation preparation device lifting arm, as well as the findings and basic ideas underlying the invention, also apply to the inventive pharmacy formulation preparation device and are not repeated at this point. "Arranged" herein means that the agitating tool is formed integrally with the agitating stick or is formed separately and attached to the agitating stick.

The agitating tool enters vertically from above into a pharmacy formulation preparation crock which can, according to the invention, be attached to the pharmacy formulation preparation device lifting arm especially quickly and yet securely, and can also be detached from the pharmacy formulation preparation device quickly and securely, which saves time and costs. The pharmacy formulation preparation crock is fastened by having outer thread regions of the fastening extension of a crock lid or a crock adapter, attached to a conventional crock lid or crock bottom, engage with inner thread regions of the crock fastening extension fastening region of the inventive lifting arm.

The invention also relates to a pharmacy formulation preparation crock of the type described herein, which is screwed into the crock fastening extension fastening region of the pharmacy formulation preparation device lifting arm with the fastening extension of the pharmacy formulation preparation crock lid or the pharmacy formulation preparation crock bottom or the pharmacy formulation preparation crock adapter.

In other words, the invention relates to a combination of a pharmacy formulation preparation device, a pharmacy formulation preparation device lifting arm and a pharmacy formulation preparation crock. The advantages and embodiments referred to above with reference to the pharmacy formulation preparation device lifting arm and the pharmacy formulation preparation crock also apply to the pharmacy formulation preparation device.

The corresponding design of the outer thread regions of the fastening extension and the inner thread regions of the crock fastening extension fastening region allow the user to operate the pharmacy formulation preparation device faster and easier and thereby increase the efficiency of the pharmacy formulation preparation device.

According to another embodiment of the pharmacy formulation preparation device, the fastening extension fastening region of the pharmacy formulation preparation device lifting arm is arranged flush with the agitating stick extending downwards from the agitating unit, which can be driven by a motor, and/or the agitating stick extends through the fastening extension of the screwed-in pharmacy formulation preparation crock.

The quick-fastening and quick-detaching mechanisms according to the invention may also be referred as quick-coupling.

BRIEF DESCRIPTION OF THE DRAWINGS

In the following, the invention is explained in greater detail by means of exemplary embodiments with reference to the accompanying drawings.

FIG. 4 shows in its partial FIG. 4a a schematic perspective view, in its partial FIG. 4b a plan view, and in its partial FIG. 4c a side view of a pharmacy formulation preparation crock lid of the pharmacy formulation preparation crock according to another exemplary embodiment of the present invention;

FIG. 9 shows in its partial FIG. 9a a plan view of the front end of the second lifting arm and of a further fastening extension of the crock lid in the insertion position, and in its partial FIG. 9b, a plan view of the front end of the second lifting arm and on the fastening extension of the crock lid in the fastening position according to another exemplary embodiment of the present invention;

DETAILED DESCRIPTION

Figure 1:
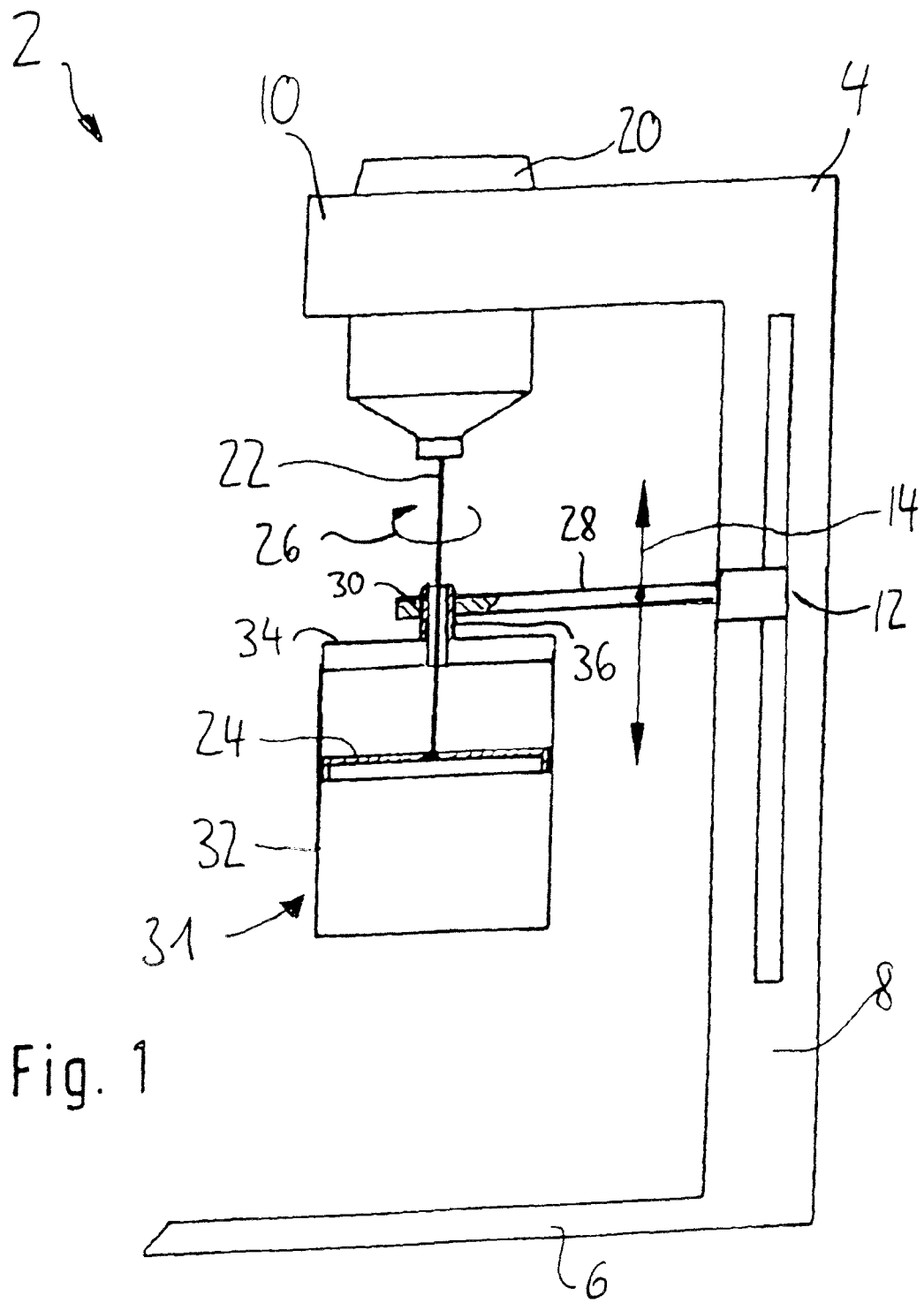
FIG. 1 shows a schematic side view of a pharmacy formulation preparation device comprising a lifting arm arranged on a lifting unit of the same, said lifting arm having a pharmacy formulation preparation device crock or crock fixed to its front side, and an agitating unit having an agitating stick and an agitating tool arranged on its head region according to an exemplary embodiment of the present invention.

FIG. 1 shows a schematic side view of a pharmacy formulation preparation device 2 comprising a lifting arm 28 arranged on a lifting unit 12 of the pharmacy formulation preparation device 2, said lifting arm 28 having a pharmacy formulation preparation device crock, or crock 31, fixed to its front side, and an agitating unit 20 having an agitating stick 22 and an agitating tool 24 arranged at the head region 10 thereof.

The pharmacy formulation preparation device 2 comprises a stand unit 4 having a base region 6, a center region 8 and a head region 10. The center region 8 extends in the vertical direction between the rear end of the base region 6 and the rear end of the head region 10, and the base region 6 and the head region 10 extend, with respect to the center region 8, towards the front. Accordingly, a workspace is enclosed by the base region 6, the center region 8 and the head region 10.

A portion of the head region 10 arranged between the middle and the front of the head region 10 has an agitating unit 20 attached thereto, comprising an agitating stick 22 extending vertically downwards therefrom and having an agitating tool 24 attached or arranged on its lower end, the agitating tool 24 entering a mixing vessel 32, or crock container 32, through a fastening extension 36 and through a pharmacy formulation preparation crock lid, or the crock lid 34, a pharmacy formulation preparation crock container. The crock lid 34, the fastening extension 36 and the crock container 32 together form the pharmacy formulation preparation crock 31. The crock 31 with the fastening extension 36 is held by the pharmacy formulation preparation device lifting arm or lifting arm 28, 56 explained below in FIG. 2 or 3. The agitating unit 20 comprises an electric motor adapted such as to be able to move the agitating stick 22 and the agitating tool 24 in the rotational direction, which is illustrated with an arrow.

A lifting unit 12 is arranged at the center region 8 and can be moved up and down by means of an electric motor, not shown, in the vertical lifting direction 14.

Alternatively, the electric motor may also be omitted. In this case, the lifting unit 12 serves as a guiding for the crock 31 attached to the lifting arm 28, wherein the crock 31, the lifting arm 28 and the lifting unit 12 are movable up and down manually by a user in the vertical direction along the center region 8.

The extent of the vertical lifting direction 14 depends on the height of the inner volume of the respective crock 31 attached to the lifting arm 28. Preferably, the lifting unit 12 may be movable between an upper position directly beneath the lower end of the upper agitating unit 22 and a lower shifting position, which is located above the base region 6 at a sufficient height for a large crock 31 to still fit between a lifting arm attached to the lifting unit 12 and the upper end of the base region 6.

The lifting unit 12 comprises a lifting arm 28 shown in FIG. 1, which is adapted integrally with the lifting unit 12 or adapted separately therefrom and attached thereto.

A crock fastening extension fastening region, the fastening region 30, respectively, is arranged at the or close to the front longitudinal end of the basic body of the lifting arm 28, comprising at least one inner thread region 50, which can be brought into engagement with at least one corresponding outer thread region 54 of the fastening extension 36 of the crock lid 34.

The pharmacy formulation preparation crock 31 comprises a basic form, herein referred to as first basic crock form, which comprises a cylindrical basic body, in whose lower end a movable bottom is arranged for pressing the individual product out, which separates the inner region of the cylindrical basic body from the outer region and comprises, on its opposite upper end, a fastening region for a pharmacy formulation preparation crock lid of the type described herein. The cylindrical basic body does not comprise any neck or is not narrowed in any other way on its upper end such that, before preparing an individual pharmaceutical product, the components for preparing the individual pharmaceutical product can be easily added to the pharmacy formulation preparation crock 31, and the individual pharmaceutical product prepared in the pharmacy formulation preparation crock 31 can be completely removed by means of a spatula, for example. Furthermore, the cylindrical basic body allows for the agitating tool to reach the entire interior space of the pharmacy formulation preparation crock 31, thereby allowing for grinding or mixing even very small agglomerates of active ingredients. The crock lid can be detached, because the ingredients could otherwise not be added or only added with difficulty through the upper opening of the crock. In the first basic crock form, the crock fastening extension fastening region is arranged on the upper side of the crock and is part of the crock lid.

The pharmacy formulation preparation crock 31 comprises a pharmacy formulation preparation crock lid 34, which can be screwed onto the circular cylindrical jacket by means of a thread. The pharmacy formulation preparation crock lid 34 has a substantially centered through-opening, as well as a substantially circular-cylindrical fastening extension 36 extending upwards from the through opening. The fastening extension 36 has, on its outer face, at least two outer thread regions spaced apart from one another in the circumferential direction, which are explained in further detail with reference to the following figures.

During operation of the inventive pharmacy formulation preparation device 2, the components for the individual pharmaceutical product to be prepared are first added to the pharmacy formulation preparation crock container 32. Afterwards, the agitating tool 24, which is connected to or arranged on the agitating stick 22, is inserted into the pharmacy formulation preparation crock container 32 and may rest on top of the ingredients or be immersed therein. Next, the agitating stick 22, which is not yet connected to the agitating unit 20, is guided through the fastening extension 36 of the pharmacy formulation preparation crock lid 34 and the pharmacy formulation preparation crock lid 34 is guided up to the pharmacy formulation preparation crock container 32 and is borne thereon or screwed thereto or fastened thereto in any other way. The overall arrangement, consisting of the pharmacy formulation preparation crock container 32, the pharmacy formulation preparation crock lid 34, the agitating tool 24 and the agitating stick 22, is then inserted into the crock fastening extension fastening region 30 of the pharmacy formulation preparation device lifting arm 28 in the vertical direction in a rotary position, in which the outer thread regions are arranged flush with threadless inner surface intermediate regions of the crock fastening extension fastening region 30 of the pharmacy formulation preparation device lifting arm 28. Afterwards, the agitating stick 22 snaps into the top of the agitating unit 20 of the pharmacy formulation preparation device 2. At the same time or subsequently, the actual fastening process is performed by rotating the pharmacy formulation preparation crock 31 along a rotation path until its outer thread regions engage with the inner thread regions of the crock fastening extension fastening region 30. This rotation path is 90° or less, depending on how many outer thread regions and inner thread regions are provided spaced apart from one another in the circumferential direction, and depending on which circumferential angle these outer thread regions and inner thread regions extend over. The preparation of the individual pharmaceutical product can now begin.

The displaceable bottom makes it possible to reduce the air in the pharmacy formulation preparation crock 31 before starting an agitating process in order to minimize the entrance of air into the components of the individual pharmaceutical product during the agitating process and, if applicable, allow for the expansion of the components of the individual pharmaceutical product, caused by heat development during the process or chemical reactions, through shifting and/or downward displacement. This can prevent the individual product from leaking at other sealing points, such as the thread between the crock container 32 and the crock lid 34 or a sealing lip between the agitating stick 22 and the crock access opening 66, thereby preventing leakage.

Figure 2:
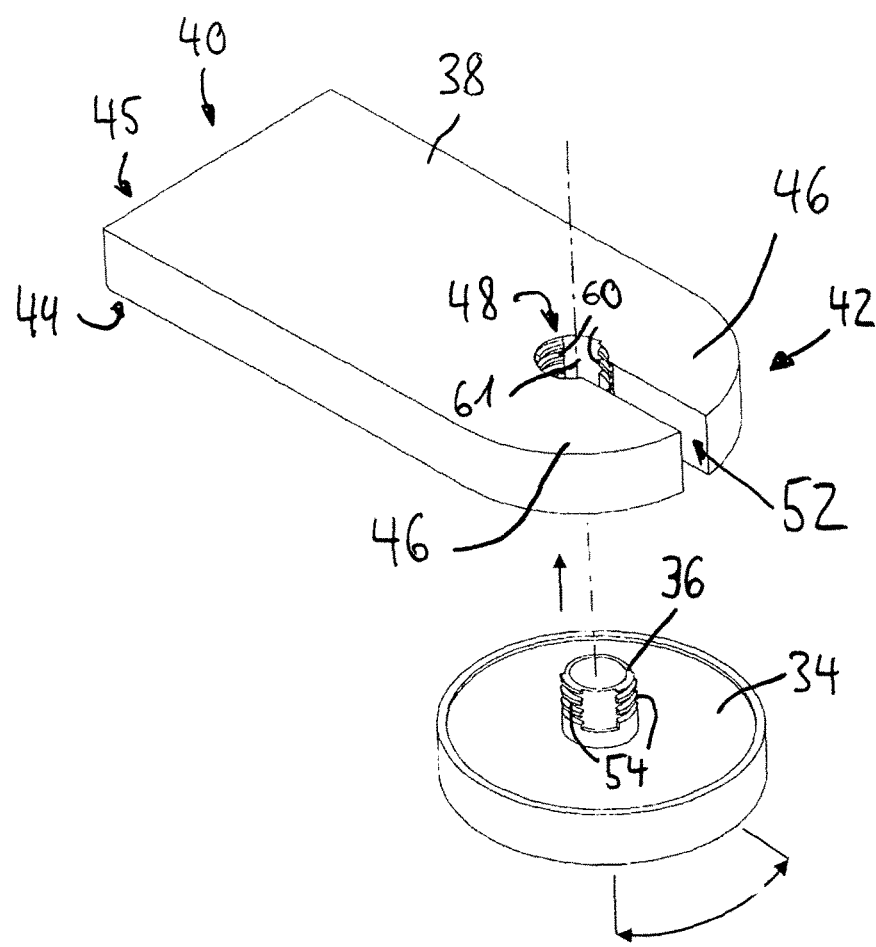
FIG. 2 shows a perspective enlarged view of the pharmacy formulation preparation device lifting arm and the pharmacy formulation preparation crock lid with the fastening extension to be attached thereto according to another exemplary embodiment of the present invention.

FIG. 2 shows a perspective enlarged view of the pharmacy formulation preparation device lifting arm 28 and the pharmacy formulation preparation crock lid 34 to be attached thereto.

The pharmacy formulation production device lifting arm 28 shown in FIG. 2 has a longitudinal basic body 38 having a substantially cuboid flat basic shape and comprising a first rear longitudinal end 40 and a second front longitudinal end 42 having claw extensions 46 with a rounded outer shape, which form a crock fastening extension fastening region 48 located on the longitudinal center axis, and an agitating stick insertion recess 52 arranged in front of it. This is especially advantageous because the agitating stick 22 protruding from the pharmacy formulation production crock 31 does not have to be guided through the crock fastening extension fastening region 48 from below. This prevents the crock fastening extension fastening region 48 from being damaged by carelessly passing the agitating stick 22 therethrough.

As an alternative, the basic body of the pharmacy formulation preparation device lifting arm comprises, at its first rear longitudinal end, a substantially square cross-section, which broadens along the basic body into a cuboid cross-section, and has its widest cross-section in a horizontal direction at the height of the crock fastening extension fastening region.

In another alternative embodiment of the basic body of the pharmacy formulation preparation device lifting arm, the basic body has a substantially fork-like or spoon-like basic form, the crock fastening extension fastening region having, in the horizontal plane, a wider form than the first rear longitudinal end of the basic body.

The crock lid 34 comprises a cylindrical lid plate 35 having a fastening extension 36 extending upwards from the middle axis in the vertical direction and also an outer lid edge 64 extending downwards from the lid plate 35. The crock lid 34 is explained in greater detail in FIG. 4.

The crock fastening extension fastening region 48 comprises, in the present exemplary embodiment, a plurality of, in particular three, inner thread regions 50 spaced apart from one another in the circumferential direction and corresponding to the three outer thread regions 54 to the fastening extension 36 of the pharmacy formulation production crock lid 34, which are also arranged spaced apart from one another. The inner thread regions 50 on the lifting arm side and the outer thread regions 54 on the crock lid fastening extension side and the threadless intermediate regions therebetween are matched to each other in a way that the fastening extension 36 can be inserted from below into the mixing vessel fastening extension fastening recess 48 in a rotary position, in which the outer thread regions 54 on the crock plate fastening extension side are positioned at the circumferential positions corresponding to the threadless regions of the crock fastening extension fastening region 48.

After being inserted from below, the crock lid 34 can now be screwed into the crock fastening extension fastening region 48, such that 54 on the crock lid fastening extension side can engage the inner thread regions 50 on the lifting arm side, thereby fastening the crock lid 34 with respect to the lifting arm 28.

The crock fastening extension fastening region 48 has a substantially cylindrical shape and the agitating stick insertion region 52 may form a substantially cuboid free space.

The sliding direction of the pharmacy formulation preparation crock lid 34 with the fastening extension 36 into the crock fastening extension fastening region 48 from below is shown in FIG. 2 by a vertical arrow. The rotational direction for moving the inner thread regions 50 and the outer thread regions 54 into the engaging fastening position and back is shown in FIG. 2 with a double arrow.

Figure 3:
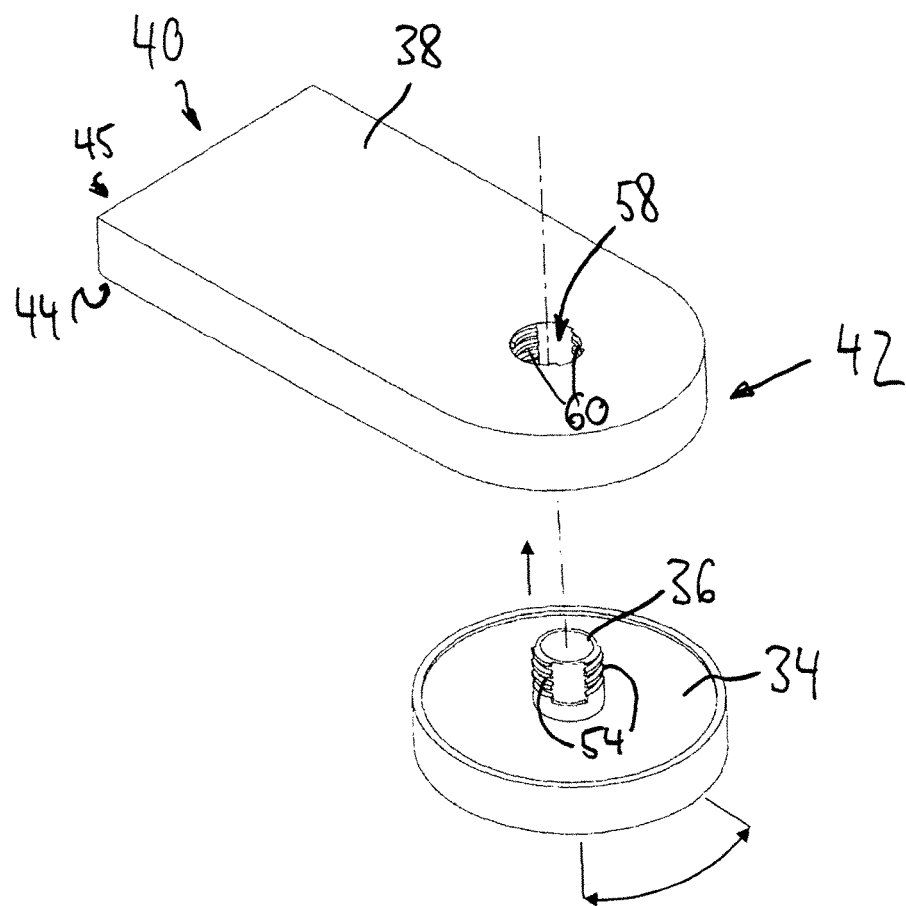
FIG. 3 shows a schematic perspective view of a second pharmacy formulation preparation device lifting arm and the pharmacy formulation preparation crock lid having a fastening extension to be attached thereto according to another exemplary embodiment of the present invention.

FIG. 3 shows a schematic perspective view of a second pharmacy formulation preparation device lifting arm 56, henceforth referred to as second lifting arm 56, and the pharmacy formulation preparation crock lid 34 with the fastening extension 36 to be attached thereto.

The second lifting arm 56 corresponds to the lifting arm 28, without an agitating stick insertion region 52 being provided and with the crock fastening extension fastening region 58 being adapted as a substantially cylindrical through-opening extending from bottom to top through the basic body 38 of the pharmacy formulation preparation device lifting arm 56. The same elements are referred to with the same reference signs as in FIG. 2 and will not be explained again to avoid repetitions.

The crock lid 34 is identical to the crock lid 34 according to FIG. 2 and is not explained again in order to avoid repetitions.

The crock fastening extension fastening region 58 is, in turn, adapted such as to comprise a plurality, in the present exemplary embodiment three, of inner thread regions 60 spaced apart from one another in the circumferential direction and inner surface intermediate regions 61 arranged therebetween.

How the crock lid 34 with the fastening extension 36 is inserted and quickly fastened in the crock fastening extension fastening region 58 of the second lifting arm 56, is described with reference to FIG. 1.

FIG. 4 shows in its partial FIG. 4*a* schematic perspective view, in its partial FIG. 4*b* a plan view and in its partial FIG. 4*b* a side view of a pharmacy formulation preparation crock lid 34 of the pharmacy formulation preparation crock 2.

The cylindrical fastening extension 36 extends upwards from the lid plate of the crock lid 34. The cylindrical fastening extension 36 has a crock access opening 66 extending therein in the center in the vertical direction, through which the agitating stick 22 of the pharmacy formulation preparation device 2 can be guided and which thus allows for access to the crock container 32, which can be arranged beneath the fastening extension 36 and the lid plate 35. This crock access opening 66 is radially outwardly limited by the inner surface of the cylindrical wall of the fastening extension 36.

The fastening extension 36 comprises an upper substantially cylindrical fastening region 74 and a lower substantially cylindrical base region 70 having a larger diameter, wherein at the transition between the lower base region 70 and the upper fastening region 74 a stopping surface 76, in particular of an annular shape, facing upwards is provided, which forms a stopper for the stopping surface 106 of a crock fastening extension fastening region 48 shown in FIG. 14. In addition, the fastening extension 36 comprises, on an upper end of the upper substantially cylindrical fastening region 74 a stopping surface, in particular of an annular shape, facing upwards, which forms a stopper for a screw-in limiting surface of the crock fastening extension fastening region 48 formed by a screw-in limiting region not shown herein. The upper fastening region 74 comprises, on its outer surface, three outer thread regions 54 spaced apart from one another in the circumferential direction and three threadless outer surface intermediate regions 55 arranged therebetween.

The thread walls of the outer thread regions 54 each have the same inclination, the same inclination direction and the same inclination angle. The inclination angle is between 3 and 5° in the non-limiting exemplary embodiment.

The outer surface intermediate regions 55 comprise fastening extension flattenings extending parallel to the longitudinal axis of the fastening extension 36, which can additionally facilitate the insertion of the fastening extension 36 into the crock fastening extension fastening region 48.

In the illustrated non-limiting exemplary embodiment, the threadless outer surface intermediate regions 55 take up an angle area of 50 to 60°. The outer thread regions 54 each take up an angle area of 60 to 70°. In FIG. 4*b*, it can be seen that one of the outer thread regions 54 is slightly wider than the other outer thread regions 54 having the same width.

The outer thread regions 54 comprise a circumferentially centered outer thread region section, in which the thread walls are of a continuous height, measured radially to the curved plane of the outer surface of the fastening extension or to the thread bottom, and two outer outer thread region sections circumferentially adjoining them in both circumferential directions, in which the height of the thread walls, also measured radially to the curved plane of the outer surface of the fastening extension or the thread bottom, i.e. from the circumferentially inner end facing the center outer thread region section towards the circumferentially outer end of the respective outer outer thread region section decreases. The circumferentially outer end of the respective outer outer thread region section transitions at this point into the curved plane of the outer surface of the fastening extension and/or the height thereof, is at this point zero.

It can further be seen that the outer thread regions 54 each comprise three thread walls, each arranged equidistantly to one another with the same inclination direction and the same inclination angle.

The fastening extension 36 may, on its upper edge, comprise a fastening extension edge chamfer extending diagonally downwards from the inner surface to the outer surface of the cylindrical wall of the fastening extension 36. Such a fastening extension edge chamfer can further facilitate the insertion of the fastening extension 36 into the crock fastening extension fastening region 48.

The cylindrical lid plate 35 further comprises a lid edge 64, which extends downwards from an outermost edge of the cylindrical lid plate 35 in the direction opposite to the fastening extension 36 and which may comprise an inner thread for being screwed onto the crock container and which corresponds to the outer thread of a pharmacy formulation preparation crock container 32 having the first basic crock form.

The lid plate 35 also comprises, between the lower end of the fastening extension 36 and the lid edge 64, a positioning marker 78, which can, in connection with another positioning marker on the lifting arm side (not shown herein), indicate the insertion position to the user. In the present non-limiting exemplary embodiment, this positioning marker 78 is formed by the name of the applicant "gako" and is arranged on top of the cylindrical lid plate 35 between the fastening extension 36 and the lid edge 64 in front of an outer thread region 54.

The surface of the upper side of the lid plate 35 is limited by an elevated edge adapted as a lid plate flange 76.

The lid plate flange 76 and the stopping surface 72 of the fastening extension 36 are matched to one another such that, in the fastening position of the fastening extension 36 in the crock fastening extension fastening region 48, both of them abut the lower side of the lifting arm 56, or the stopping surface 106 of the crock fastening extension fastening region 48, respectively.

At the lid edge 64, a lid edge profile 68 is provided radially extending from the middle axis of the crock lid 34, by means of which the crock lid 34 can be securely held by a user in order to fasten the crock lid on a pharmacy formulation preparation crock container 32 through rotation. The lid edge profile 68 comprises a plurality of grooves extending from the cylindrical lid plate 35 downwards in the vertical direction over across the lid edge 64.

Figure 5A:
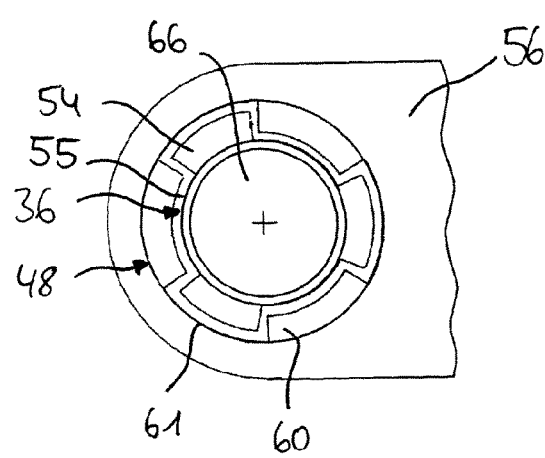
FIG. 5 shows in its partial FIG. 5a a plan view of the front end of the second lifting arm and on the fastening extension of the crock lid in the insertion position, and in its partial FIG. 5b, a plan view of the front end of the second lifting arm and the fastening extension of the crock lid in the fastening position according to another exemplary embodiment of the present invention.
Figure 5B:
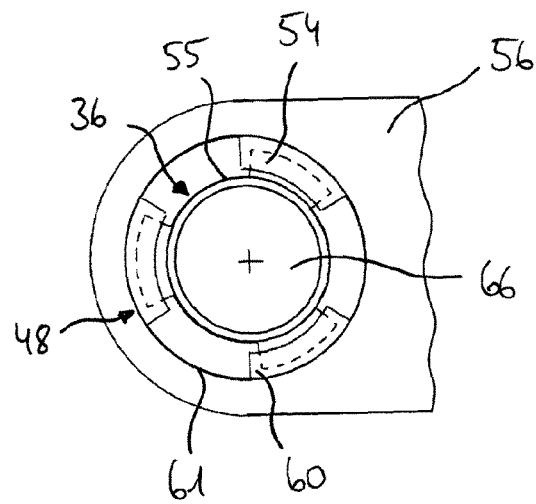

FIG. 5 shows in its partial FIG. 5a a plan view of the front end of the second lifting arm 56 and of the fastening extension 36 of the crock lid 34 that has been inserted from below into the crock fastening extension fastening region 48 of the second lifting arm 56, and in its partial FIG. 5b, a plan view of the front end of the second lifting arm 56 and of the fastening extension 36 of the crock lid 34 that has been inserted from below into the crock fastening extension fastening region 48 of the second lifting arm 56 and has been rotated in the fastening position, in which the outer thread regions 54 on the fastening extension side engage with the inner thread regions 60 on the lifting arm side.

It is clearly shown that the crock fastening extension fastening region 48 comprises three inner thread regions 60 arranged equidistantly with respect to one another and having an overall number of three threadless inner surface intermediate regions 61 arranged therebetween. It is also clearly shown that the fastening extension 36 of the crock lid 34 comprises a cylindrical wall having three outer thread regions 54 arranged equidistantly with respect to one another extending therefrom, each having a threadless outer surface intermediate region 55 arranged between two outer thread regions 54.

The crock access opening 66 extending in the vertical direction through the center of the fastening extension 36, through which the agitating stick 22 of the pharmacy formulation preparation device 2 can be guided and which thus allows for an access to the crock container 32, which can be attached below the fastening extension 36 and the lid plate 35, is clearly shown in the following Figures. This crock access opening 66 is limited radially outwards by the inner surface of the cylindrical wall of the fastening extension 36.

The outer thread regions 54 on the fastening extension side each take up angle areas of approximately 45° in the illustrated non-limiting exemplary embodiment, and the outer surface intermediate regions 55 accordingly each take up angle areas of approximately 75°. The inner thread regions 60 on the lifting arm side each take up, in the illustrated non-limiting exemplary embodiment, angle areas of approximately 60°, and the threadless inner surface intermediate regions 61 accordingly each take up angle areas of approximately 60°.

It was found that when the threadless inner surface intermediate regions 61 on the lifting arm side each take up a larger angle area than the outer thread regions 54 on the fastening extension side, the fastening extension 36 can be inserted especially easily into the crock fastening extension fastening region 48 from below.

The diameters of the outer thread regions 54, the threadless outer surface intermediate regions 55, the inner thread regions 60 and the threadless inner surface intermediate regions 61 are matched to one another. The diameter of the threadless outer surface intermediate regions 55 must be at the most of equal size, in particular slightly smaller, than the diameter of the burrs of the inner thread regions 60, and the diameter of the burrs of the outer thread regions 54 must be at the most of equal size, in particular slightly smaller, than the diameter of the threadless inner surface intermediate regions 61. In addition, the inner thread regions 60 and the outer thread regions 54 must be matched to one another such that they engage one another, when being rotated from the insertion position into the fastening position, over an engagement height that is not too small. This allows for the fastening extension 36 to be inserted into the insertion position and rotated into the fastening position.

The outer thread regions 54 and the inner thread regions 60 each comprise a plurality of thread walls having the same inclination and being arranged equidistantly on top of each other in an axial direction, the inclination direction and the inclination angle being the same for the outer thread regions 54 and the inner thread regions 60.

The outer thread regions 54 and the inner thread regions 60 each comprise thread walls having a constant height in the circumferential direction.

According to FIG. 5b, the outer thread regions 54 on the fastening extension-side have been brought into engagement with the inner thread regions 50 on the fastening extension side by rotating the fastening extension 36 by an angle of approximately 60° in an inclination direction of the outer thread regions 54 and the inner thread regions 60.

It is clearly shown that the outer thread regions 54, in particular the thread walls of the outer thread regions 54, engage with the inner thread regions 60, in particular the thread walls of the inner thread regions 60, over the entire circumferential width thereof. However, at the circumferentially outer ends of the inner thread regions 60, a small section may remain on each of them, having no outer thread regions 54 engaging therewith. In other words, the outer thread regions 54 do, in the engaging fastening position, not take up the entire circumferential width of the inner thread regions 60.

Figure 6A:
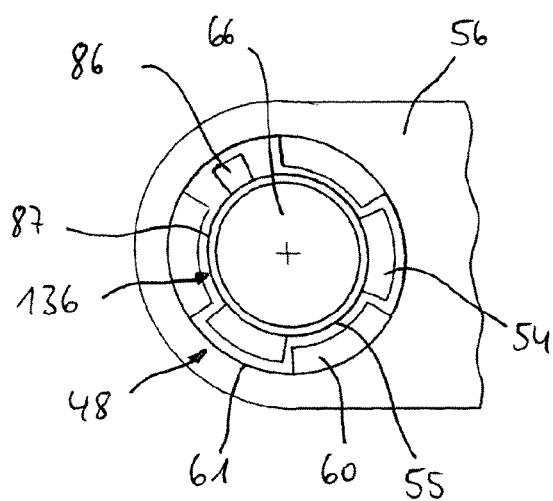
FIG. 6 shows in its partial FIG. 6a a plan view of the front end of the second lifting arm and of a further fastening extension of the crock lid in the insertion position, and in its partial FIG. 6b, a plan view of the front end of the second lifting arm and the fastening extension of the crock lid in the fastening position according to another exemplary embodiment of the present invention.
Figure 6B:
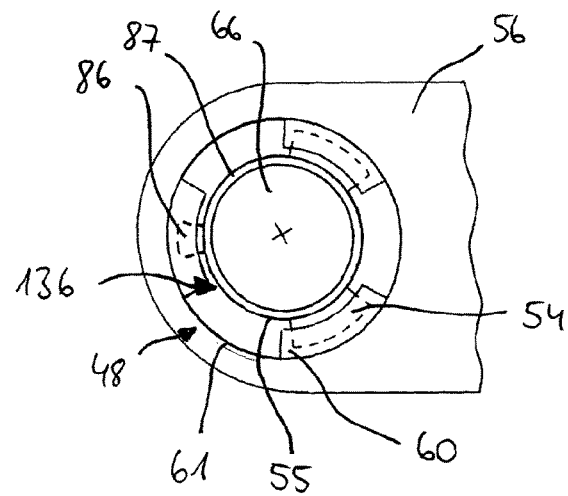

FIG. 6 shows in its partial FIG. 6a a plan view of the front end of the second lifting arm 56 and of the fastening extension 136 of the crock lid 34 that has been inserted from below into the crock fastening extension fastening region 48 of the second lifting arm 56, and in its partial FIG. 6b, a plan view of the front end of the second lifting arm 56 and of the fastening extension 136 of the crock lid 34 that has been inserted from below into the crock fastening extension fastening region 48 of the second lifting arm 56 and has been rotated in the fastening position, in which the outer thread regions 54 on the fastening extension side engage with the inner thread regions 60 on the lifting arm side.

The second lifting arm 56 with its crock fastening extension fastening region 48, as well as the insertion position in FIG. 6a and the fastening position in FIG. 6b, correspond to the illustration in FIG. 5. The same elements are referred to with the same reference signs and are not explained again to avoid repetitions.

The only difference is that the fastening extension 136 does not, like the fastening extension 36, comprise three outer thread regions 54 of the same width arranged equidistantly to one another and analogously three outer surface intermediate regions 55 of the same width arranged equidistantly to one another.

The fastening extension 136 rather comprises two adjacent outer thread regions 54 of the same width, which is, in the present non-limiting exemplary embodiment, 45° for each, and a third narrower outer thread region 86, the width of which is only 10°.

The threadless outer surface intermediate region 88 arranged between the two outer thread regions 54 of larger width corresponds, with respect to the circumferential width, to the threadless outer surface intermediate regions 55 of the fastening extension 36 according to FIG. 5, the width of which is, in turn, approximately 75°.

The threadless outer surface intermediate regions 87 are, in contrast, adapted wider between the two outer thread regions 54 and each take up angle areas of approximately 90°.

In the fastening position shown in FIG. 6b, the narrower outer thread region 86 therefore only takes up a relatively small part of the circumferential width of the inner thread region 60.

Figure 7A:
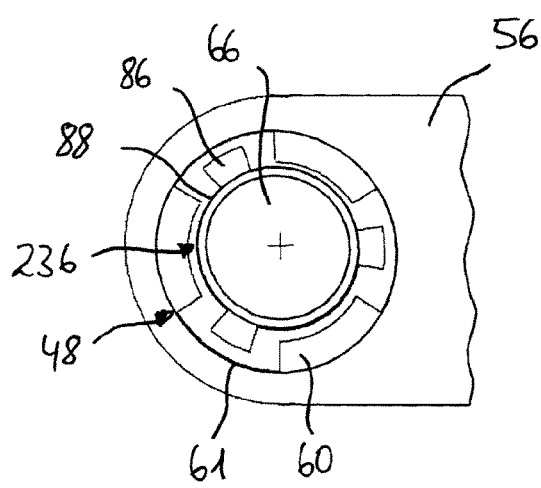
FIG. 7 shows in its partial FIG. 7a a plan view of the front end of the second lifting arm and of a further fastening extension of the crock lid in the insertion position, and in its partial FIG. 7b, a plan view of the front end of the second lifting arm and the fastening extension of the crock lid in the fastening position according to another exemplary embodiment of the present invention.
Figure 7B:
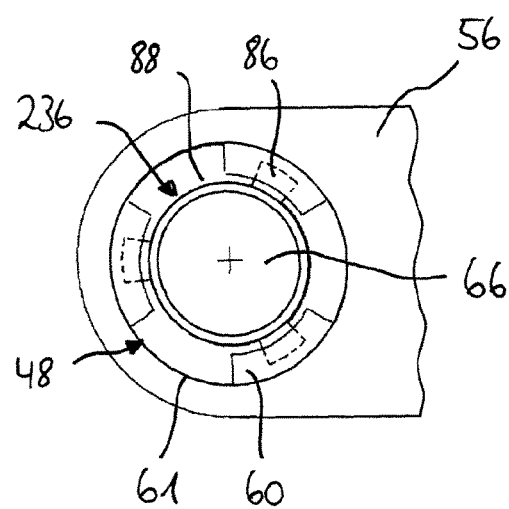

FIG. 7 shows in its partial FIG. 7a a plan view of the front end of the second lifting arm 56 and of the fastening extension 236 of the crock lid 34 that has been inserted from below into the crock fastening extension fastening region 48 of the second lifting arm 56, and in its partial FIG. 7b, a plan view of the front end of the second lifting arm 56 and of the fastening extension 236 of the crock lid 34 that has been inserted from below into the crock fastening extension fastening region 48 of the second lifting arm 56 and has been rotated in the fastening position, in which the outer thread regions 54 on the fastening extension side engage with the inner thread regions 60 on the lifting arm side.

Figure 8A:
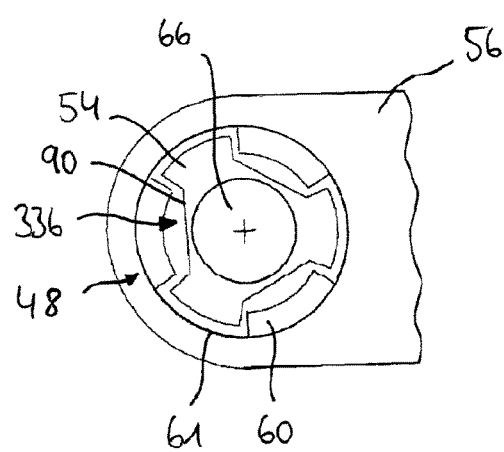
FIG. 8 shows in its partial FIG. 8a a plan view of the front end of the second lifting arm and of a further fastening extension of the crock lid in the insertion position, and in its partial FIG. 8b, a plan view of the front end of the second lifting arm and the fastening extension of the crock lid in the fastening position.
Figure 8B:
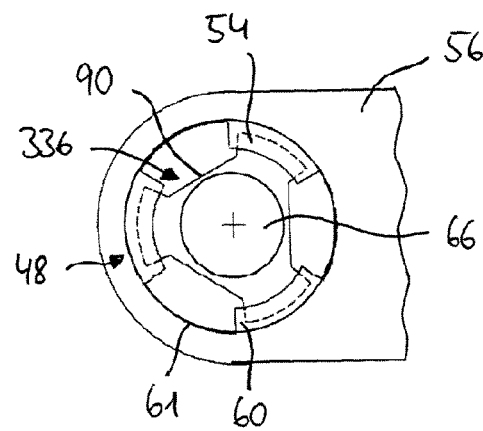

The second lifting arm 56 with its crock fastening extension fastening region 48, as well as the insertion position in FIG. 5a and the fastening position in FIG. 8b, correspond to the illustration in FIG. 6. The same elements are referred to with the same reference signs and are not explained again to avoid repetitions.

The fastening extension 236 has, like the fastening extension 36 according to FIG. 5, its outer thread regions 86 arranged equidistantly to one another. Analogously, the fastening extension 236 comprises three outer surface intermediate regions 87 arranged equidistantly to one another.

The only difference is that the outer thread regions 86 have a smaller width than the outer thread regions 54 according to FIG. 5 and only take up a width of approximately 10°, like the outer thread regions 86 according to FIG. 6, and are therefore referred to with the same reference signs, and that the threadless outer surface intermediate regions 88 are accordingly wider than the threadless outer surface intermediate regions 55 according to FIG. 5 and are referred to with the reference sign 88. The outer surface intermediate regions 88 each have a width of approximately 110°.

FIG. 8 shows in its partial FIG. 8a a plan view of the front end of the second lifting arm 56 and of the fastening extension 336 of the crock lid 34 that has been inserted from below into the crock fastening extension fastening region 48 of the second lifting arm 56, and in its partial FIG. 6b, a plan view of the front end of the second lifting arm 56 and of the fastening extension 336 of the crock lid 34 that has been inserted from below into the crock fastening extension fastening region 48 of the second lifting arm 56 and has been rotated in the fastening position, in which the outer thread regions 54 on the fastening extension side engage with the inner thread regions 60 on the lifting arm side.

The second lifting arm 56 with its crock fastening extension fastening region 48, as well as the insertion position in FIG. 8a and the fastening position in FIG. 8b, each correspond to the illustration in FIG. 5. The same elements are referred to with the same reference signs and are not explained again to avoid repetitions.

The fastening extension 336 also corresponds to a great extent to the fastening extension 36 according to FIG. 5, in particular with respect to the design of its outer thread regions 54. The same elements are referred to with the same reference signs and are not explained again to avoid repetitions.

The only difference between the fastening extension 336 and the fastening extension 36 according to FIG. 5 is that the threadless outer surface intermediate regions have no cylindrical or cylindrical segment-shaped outer form.

The threadless outer surface intermediate regions referred to with the reference sign 90 are rather each arranged in a plane extending parallel to the longitudinal axis of the fastening extension 336 and connecting the circumferentially outer ends of the adjacent outer thread regions 54, in particular the outer ends of the thread bottoms of two adjacent outer thread regions 54, to each other.

The fastening extension 336 correspondingly has a cylindrical-segment-shaped inner wall; its outer shape is—generally speaking—similar to an equal-sided triangle, the sides of which are formed by the threadless outer surface intermediate regions 90, with the outer thread regions 54 located at the transitions between two respective neighboring outer surface intermediate regions 90.

FIG. 9 shows in its partial FIG. 9a a plan view of the front end of the second lifting arm 56 and of the fastening extension 436 of the crock lid 34 that has been inserted from below into the crock fastening extension fastening region 48 of the second lifting arm 56, and in its partial FIG. 6b, a plan view of the front end of the second lifting arm 56 and of the fastening extension 436 of the crock lid 34 that has been inserted from below into the crock fastening extension fastening region 48 of the second lifting arm 56 and has been rotated in the fastening position, in which the outer thread regions 54 on the fastening extension side engage with the inner thread regions 60 on the lifting arm side.

Figure 10A:
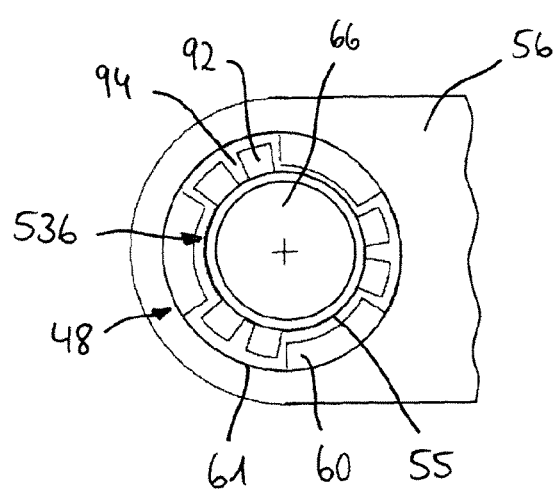
FIG. 10 shows in its partial FIG. 10a a plan view of the front end of the second lifting arm and of a further fastening extension of the crock lid in the insertion position, and in its partial FIG. 10b, a plan view of the front end of the second lifting arm and the fastening extension of the crock lid in the fastening position according to another exemplary embodiment of the present invention.
Figure 10B:
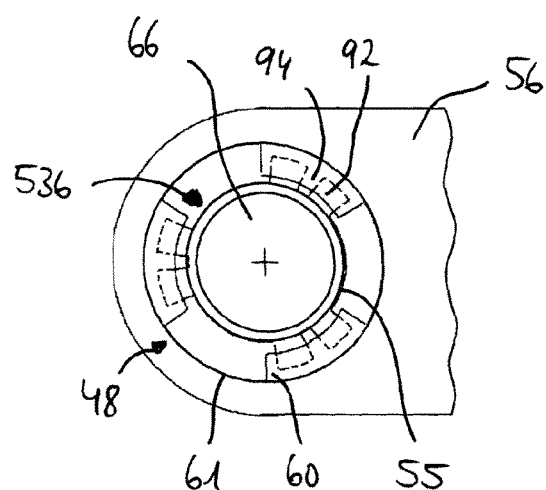

The second lifting arm 56 with its crock fastening extension fastening region 48, as well as the insertion position in FIG. 9a and the fastening position in FIG. 10b, each correspond to the illustration in FIG. 5. The same elements are referred to with the same reference signs and are not explained again to avoid repetitions.

The fastening extension 436 also corresponds to a great extent to the fastening extension 36 according to FIG. 6, in particular with respect to the design of its threadless outer surface intermediate regions 55 and the design of two of its threadless outer thread regions 54. The same elements are referred to with the same reference signs and are not explained again to avoid repetitions.

The only difference between the fastening extension 436 and the fastening extension 36 according to FIG. 5 is that the third outer thread region is adapted as two outer thread region partial sections 92 having an outer thread region interruption 84 circumferentially arranged therebetween. The circumferential width of the two outer thread region partial sections 92 and of the outer thread region interruption 94 arranged therebetween corresponds to the width of one outer thread region 54 and is, in the present non-limiting exemplary embodiment, 45°. The two outer thread region partial sections 92 each take up an angle area of approximately 20°, and the outer thread region interruption 94 takes up an angle area of approximately 5°.

The thread walls of the outer thread region partial sections 92 are arranged in extension with respect to one another and have the same inclination angle and the same thread wall height as the thread walls of the outer thread regions 54.

FIG. 10 shows in its partial FIG. 10a a plan view of the front end of the second lifting arm 56 and of the fastening extension 436 of the crock lid 34 that has been inserted from below into the crock fastening extension fastening region 48 of the second lifting arm 56, and in its partial FIG. 10b, a plan view of the front end of the second lifting arm 56 and of the fastening extension 436 of the crock lid 34 that has been inserted from below into the crock fastening extension fastening region 48 of the second lifting arm 56 and has been rotated in the fixing position, in which the outer thread regions 54 on the fastening extension side engage with the inner thread regions 60 on the lifting arm side.

The second lifting arm 56 having its crock fastening extension fastening region 48, as well as the insertion position in FIG. 10a and the fastening position in FIG. 10b, each correspond to the illustration in FIG. 5. The same elements are referred to with the same reference signs and are not explained again to avoid repetitions.

The fastening extension 536 also corresponds to a great extent to the fastening extension 436 according to FIG. 9, in particular with respect to the design of its threadless outer surface intermediate regions 55. The same elements are referred to with the same reference signs and are not explained again to avoid repetitions.

In contrast to the fastening extension 436, the fastening extension 536 has all three outer thread regions adapted in the form of two outer thread region partial sections 92 each having an outer thread region interruption 94 circumferentially arranged therebetween. The circumferential width of the two outer thread region partial sections 92 and of the outer thread region interruption 94 arranged therebetween of each inner thread region is, in the present non-limiting exemplary embodiment, approximately 45%. The two outer thread region partial sections 92 both take up an angle area of approximately 20° and the outer thread region interruption 94 take up an angle area of approximately 5°.

Figure 11A:
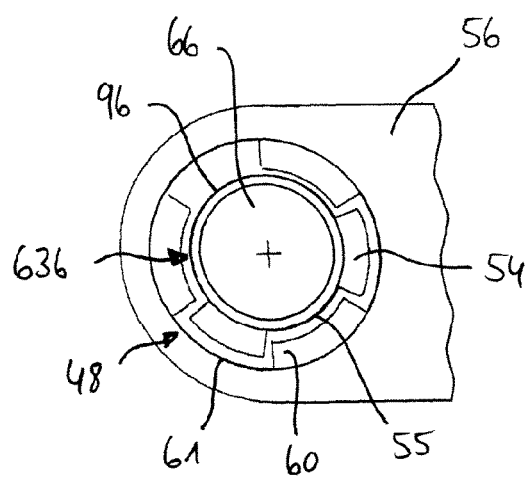
FIG. 11 shows in its partial FIG. 11a a plan view of the front end of the second lifting arm and of a further fastening extension of the crock lid in the insertion position, and in its partial FIG. 11b, a plan view of the front end of the second lifting arm and the fastening extension of the crock lid in the fastening position according to another exemplary embodiment of the present invention.
Figure 11B:
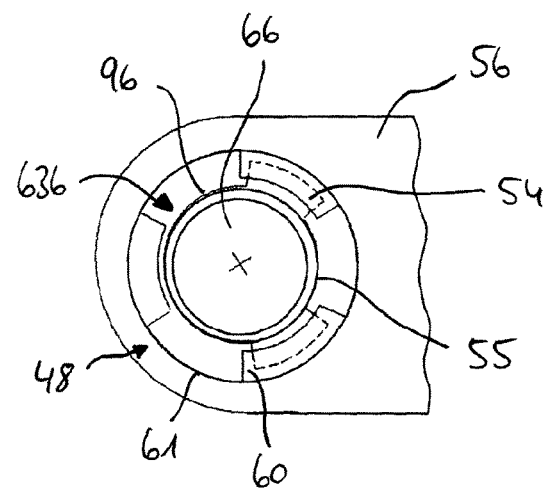

FIG. 11 shows in its partial FIG. 11a a plan view of the front end of the second lifting arm 56 and of the fastening extension 636 of the crock lid 34 that has been inserted from below into the crock fastening extension fastening region 48 of the second lifting arm 56, and in its partial FIG. 11b, a plan view of the front end of the second lifting arm 56 and of the fastening extension 636 of the crock lid 34 that has been inserted from below into the crock fastening extension fastening region 48 of the second lifting arm 56 and has been rotated in the fixing position, in which the outer thread regions 54 on the fastening extension side engage with the inner thread regions 60 on the lifting arm side.

The second lifting arm 56 with its crock fastening extension fastening region 48, as well as the insertion position in FIG. 11a and the fastening position in FIG. 11b, each correspond to the illustration in FIG. 5. The same elements are referred to with the same reference signs and are not explained again to avoid repetitions.

The fastening extension 636 also corresponds to a great extent to the fastening extension 36 according to FIG. 5, wherein two of the outer thread regions 54 and the outer surface intermediate region 55 enclosed by these two outer thread regions 54 are identical with the corresponding elements of the fastening extension 36.

In contrast to the fastening extension 36, the fastening extension 636 does not, however, have a third outer thread region. Instead, a wide threadless outer surface intermediate region 96 is provided between the outer thread regions 54 on the other side of the threadless outer surface intermediate region 55 and takes up an angle area of approximately 195° overall.

Figure 12A:
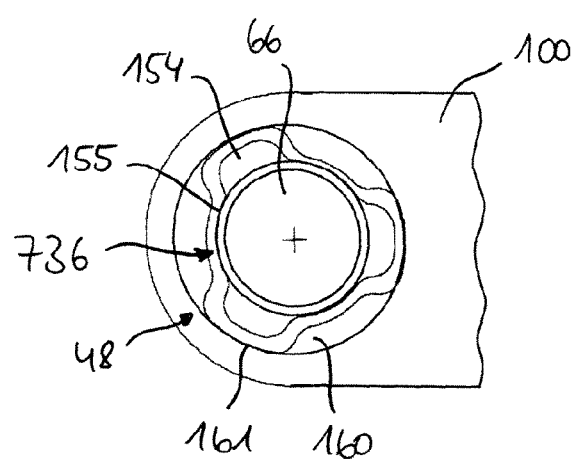
FIG. 12 shows in its partial FIG. 12a a plan view of the front end of a third lifting arm and of a further fastening extension of the crock lid in the insertion position, and in its partial FIG. 12b a plan view of the front end of the third lifting arm and the fastening extension of the crock lid in the fastening position according to another exemplary embodiment of the present invention.
Figure 12B:
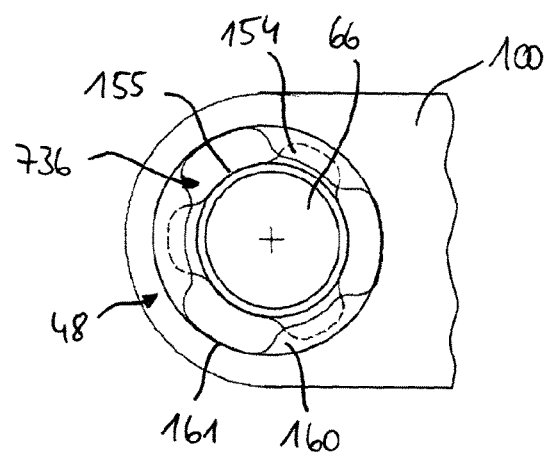

In the fastening position shown in FIG. 11b, it is clearly shown that the two outer thread regions 54 each engage with two neighboring inner thread regions 60—in FIG. 12b with the inner thread regions 60 on the top and on the bottom on the left side—and that there is no engagement with respect to the inner thread region 60 on the bottom on the right.

In particular, when the upper side of the crock lid plate abuts the lower side of the lifting arm, such fastening with only two outer thread regions 54 is sufficiently secure.

FIG. 12 shows in its partial FIG. 12a a plan view of the front end of the third lifting arm 100 and of the fastening extension 736 of the crock lid 34 that has been inserted from below into the crock fastening extension fastening region 48 of the third lifting arm 100, and in its partial FIG. 12b, a plan view of the front end of the third lifting arm 100 and of the fastening extension 736 of the crock lid 34 that has been inserted from below into the crock fastening extension fastening region 48 of the third lifting arm 100 and has been rotated in the fixing position, in which the outer thread regions 160 on the fastening extension side engage with the outer thread regions 154 on the lifting arm side.

The fastening extension fastening region 48 of the third lifting arm 100 in turn comprises three inner thread regions 160 arranged equidistantly with respect to one another and having an overall number of three threadless inner surface intermediate regions 161 arranged therebetween. The fastening extension 736 of the crock lid 34 comprises a cylindrical wall having three outer thread regions 154 arranged equidistantly with respect to one another, wherein two outer thread regions 154 each have a threadless inner surface intermediate region 155 being arranged therebetween.

In contrast to the outer thread regions 54 of the fastening extension 36 according to FIG. 5, the outer thread regions 154 of the fastening extension 736, in particular the thread walls thereof, have no continuous height over their entire circumferential width.

The outer thread regions 154 rather have a circumferentially centered outer thread region section, in which the thread walls are of a continuous height, measured radially to the curved plane of the outer surface of the fastening extension or to the thread bottom, and two outer outer thread region sections circumferentially adjoining them in both circumferential directions, in which the height of thread walls, again measured radially to the curved plane of the outer surface of the fastening extension or to the thread bottom, decreases from the circumferentially inner end facing the centered outer thread region section towards the circumferentially outer end of the respective outer outer thread region section. The circumferentially outer end of the respective outer outer thread region section transitions into the curved plane of the outer surface of the fastening extension at this point, and the height thereof is at this point zero.

The circumferential width of the outer thread regions 154, including the center outer thread region section and including the two outer outer thread region sections, is approximately 30 to 40°. Accordingly, the circumferential width of the threads of the threadless outer surface intermediate regions 155 is approximately 80 to 90°.

The inner thread regions 160 have no continuous height over their entire circumferential width, either. These inner thread regions are rather divided into a circumferentially centered inner thread region, in which the thread walls have a continuous height, measured radially to the curved plane of the inner surface of the crock fastening extension fastening region 48 or to the thread bottom, and two outer inner thread region sections adjoining thereto them circumferentially on both sides, in which the height of the thread walls, measured radially to the curved plane of the inner surface of the crock fastening extension fastening region 48 or to the thread bottom, decreases, and in particular decreases such that the circumferentially outer end of the respective outer inner thread region section transitions into the curved plane of the inner surface of the crock fastening extension fastening region 48, and the height thereof is at this point zero, again measured radially to the curved plane of the outer surface of the fastening extension 48 or to the thread bottom.

The circumferential width of the inner thread regions 160, including the center inner thread region section and the circumferentially outer inner thread region sections, is approximately 60°. Accordingly, the circumferential width of the threadless inner surface intermediate regions 161 is approximately 60°.

It was found that when the threadless inner surface intermediate regions 161 on the lifting arm side each take up a slightly larger angle area than the outer thread regions 154 on the fastening extension side, the fastening extension 736 can be inserted into the fastening extension fastening region 48 especially easily from below.

The diameters of the outer thread regions 154, the threadless outer surface intermediate regions 155, the inner thread regions 160 and the threadless inner surface intermediate regions 161 are matched to one another. The diameter of the threadless outer surface intermediate regions 155 must be at the most of equal size, in particular slightly smaller, than the diameter of the burrs of the inner thread regions 160, and the diameter of the burrs of the outer thread regions 154 must be at the most of equal size, in particular slightly smaller, than the diameter of the threadless inner surface intermediate regions 161. In addition, the inner thread regions 160 and the outer thread regions 154 must be matched to one another such that, when being rotated from the insertion position into the fastening position, they engage one another over an engagement height that is not too small. This allows for the fastening extension 736 to be slid into the insertion position and be rotated into the fastening position.

The outer thread regions 154 and the inner thread regions 160 each comprise a plurality of thread walls having the same inclination and being arranged equidistantly on top of each other in the axial direction, the inclination direction and the inclination angle being the same for the outer thread regions 154 and the inner thread regions 160.

According to FIG. 12*b*, the outer thread regions 154 on the fastening extension side have been brought into engagement with the inner thread regions 150 on the lifting arm side by rotating the fastening extension 736 by an angle of approximately 60° in the inclination direction of the outer thread regions 154 and the inner thread regions 160.

It is clearly shown that the outer thread regions 154, in particular the thread walls of the outer thread regions 154, engage with the inner thread regions 160, in particular the thread walls of the inner thread regions 160, over the entire circumferentially width thereof. However, at the circumferentially outer ends of the inner thread regions 160, a small section may remain on each of them, having no outer thread region 154 engaging therewith. In other words, the outer thread regions 154 do, in the engaging fastening position, not take up the entire circumferential width of the inner thread regions 60.

Figure 13:
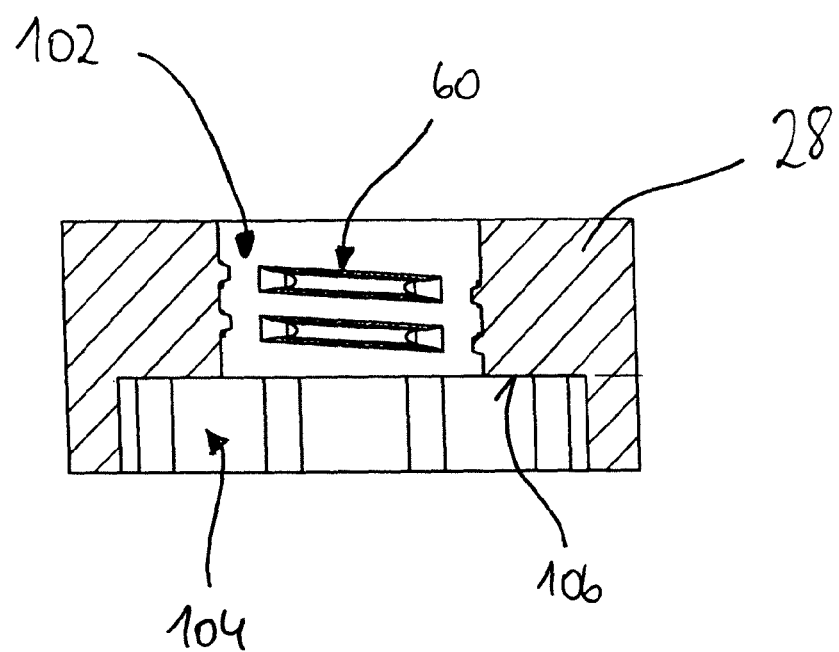
FIG. 13 shows a cross-section of the crock fastening extension fastening region of the second lifting arm according to another exemplary embodiment of the present invention.

FIG. 13 shows a cross-section through the crock fastening extension fastening region 48 of the second lifting arm 56.

The crock fastening extension fastening region 48 comprises an upper substantially cylindrical recess region 102 and a lower substantially cylindrical recess region 104 having a larger diameter, wherein at the transition between the lower and the upper substantially cylindrical recess regions 102 and 104, a stopping surface 106, in particular of an annular shape, facing downwards is formed, which forms a stopper for a stopping surface of the fastening extension 36 of the pharmacy formulation preparation crock lid 34. The upper recess region 102 comprises, on its inner face, three inner thread regions 60 spaced apart with respect to one another in the circumferential direction and each having two thread walls, of which in FIG. 13 one inner thread region 60 can be seen behind the sectional plane and is extending to the front out of the drawing plane, and two inner thread regions 60 can be seen on the left and on the right in the sectional plane. This stopping surface defines the final fastening position in the vertical direction.

The final fastening position is reached when the crock lid 34 is, first, inserted in the vertical direction, in a rotary position, in which the outer thread regions 54 are arranged flush with the threadless inner faces 61 of the crock fastening extension fastening region 48 of the lifting arm 56, and is then rotated into the fastening position, in which the outer thread regions 54 engage with the inner thread regions 60 until the stopping surface on the fastening extension side abuts the stopping surface 106 of the crock fastening extension fastening region.

In another exemplary embodiment not shown, a screw-in limiting region is provided in the vertical direction on the upper end of the upper substantially cylindrical recess region of the crock fastening extension fastening region, which has a smaller diameter than the crock fastening extension fastening region and forms a screw-in limiting surface facing downwards, on which the stopping surface of the fastening extension of the pharmacy formulation preparation crock lid abuts as soon as the pharmacy formulation preparation crock lid is in its fastening position, in which the outer thread regions engage with the inner thread regions.

The present exemplary embodiments are described with reference to a crock lid. A crock bottom or a crock adapter may also comprise such a fastening extension or a fastening body formed equally on its outer side. The patent application explicitly encompasses these exemplary embodiments. They are explained in detail in the general part of the description and covered by the accompanying patent claims.

The invention claimed is:

1. A pharmacy formulation preparation crock lid or pharmacy formulation preparation crock bottom of a pharmacy formulation preparation crock for preparing an individual pharmaceutical product in a pharmacy, wherein the pharmacy formulation preparation crock lid or pharmacy formulation preparation crock bottom is adapted for quick and detachable screw-fastening to a pharmacy formulation preparation device lifting arm for a pharmacy formulation preparation device for preparing an individual pharmaceutical product, comprising:

a lid plate or a bottom plate, respectively, wherein the lid plate or the bottom plate, respectively, comprises a substantially cylindrical fastening extension, hollow on the inside, extending from the lid plate upwards or from the bottom plate downwards, respectively, and allowing access to the region of the pharmacy formulation preparation crock located below the lid plate or above the bottom plate, respectively, for detachably fastening the pharmacy formulation preparation crock lid to a lifting arm of the pharmacy formulation preparation device, and wherein the fastening extension comprises on its outer surface at least two outer thread regions spaced apart from one another in the circumferential direction; wherein the outer thread regions are, in the circumferential direction, each arranged equidistantly with respect to each other and each take up angle areas of equal size, or wherein one outer thread region takes up, in the circumferential direction, a smaller angle area than at least one further outer thread region; wherein the pharmacy formulation preparation crock lid or pharmacy formulation preparation crock bottom further comprises a positioning marker on the upper side of the lid plate or on the lower side of the bottom plate, respectively, for specifying the rotational insertion position of the pharmacy formulation preparation crock lid or the pharmacy formulation preparation crock bottom with respect to a pharmacy formulation preparation device lifting arm.

2. The pharmacy formulation preparation crock lid or pharmacy formulation preparation crock bottom according to claim 1, wherein the outer thread regions each comprise a plurality of thread walls arranged, in the axial direction, equidistantly on top of one another with the same inclination.

3. The pharmacy formulation preparation crock lid or pharmacy formulation preparation crock bottom according to claim 1, wherein a threadless outer surface intermediate region is each arranged between two outer thread regions spaced apart from one another in the circumferential direction, and wherein the pharmacy formulation preparation crock lid or pharmacy formulation preparation crock bottom further comprises three outer thread regions spaced apart from one another in the circumferential direction, each having threadless outer surface intermediate regions arranged therebetween.

4. The pharmacy formulation preparation crock lid or pharmacy formulation preparation crock bottom according to claim 3, wherein the threadless outer surface intermediate regions are adapted in the shape of cylinder segments or have a curved shape, in a radial cross-section, or wherein the threadless outer surface intermediate regions each form a plane extending parallel to the longitudinal axis of the fastening extension, which plane connects the circumferentially outer ends of respectively neighboring outer thread regions.

5. The pharmacy formulation preparation crock lid or pharmacy formulation preparation crock bottom according to claim 1, wherein the outer thread regions each take up an angle area of 10 to 90.

6. The pharmacy formulation preparation crock lid or pharmacy formulation preparation crock bottom according to claim 1, wherein at least one of the outer thread regions comprises at least one circumferentially centered outer thread region section and two outer thread region sections circumferentially adjoining them on both sides in the circumferential direction, and wherein in particular at least one thread wall has, in the circumferentially centered outer thread region section, a continuous height, measured radially to the curved plane of the outer surface of the fastening extension or measured to the thread bottom.

7. The pharmacy formulation preparation crock lid or pharmacy formulation preparation crock bottom according to claim 6, wherein the height of the thread walls in the circumferentially outer thread region sections, decreases, measured radially to the curved plane of the outer surface of the fastening extension or measured to the thread bottom, from the circumferentially inner end facing the center outer thread region section towards the circumferentially outer end of the respective outer thread region section, and in particular decreases such that the circumferentially outer end of the respective outer thread region section transitions into the curved plane of the outer surface of the fastening extension, and/or the height thereof, measured radially to the curved plane of the outer surface of the fastening extension, is zero.

8. The pharmacy formulation preparation crock lid or pharmacy formulation preparation crock bottom according to claim 1, wherein at least one of the outer thread regions comprises at least one thread wall having a continuous height, measured radially to the curved plane of the outer surface of the fastening extension or to the thread bottom, and wherein one outer thread region is adapted as a pair of two outer thread region segments interrupted in the circumferential direction.

9. The pharmacy formulation preparation crock lid or pharmacy formulation preparation crock bottom according to claim 1, further comprising at least one positioning elevation extending radially outwards from the fastening extension, which rises in the vertical direction from the lid plate or the bottom plate along the extension direction of the fastening extension up to 4 mm; wherein the at least one positioning elevation is arranged close to an outer thread region of the fastening extension in order to form a stopper for a removal position indication pin of a pharmacy formulation preparation device lifting arm, and wherein the fastening extension comprises an upper substantially cylindrical fastening region and a lower substantially cylindrical base region having a larger diameter, wherein at a transition between the lower base region and the upper fastening region, a stopping surface of an annular shape facing upwards is formed, which forms a stopper for a stopping surface of a crock fastening extension fastening region; wherein the upper crock fastening extension fastening region comprises on its outer surface at least two outer thread regions spaced apart from one another in the circumferential direction.

10. The pharmacy formulation preparation crock lid according to claim 1, wherein the upper substantially cylindrical fastening region comprises on its upwards-facing side, a stopping face of an annular shape, which forms a stopper for a screw-in limiting surface of a screw-in limiting region, and wherein the fastening extension comprises a lower substantially cylindrical fastening region and an upper substantially cylindrical base region having a larger diameter, wherein at the transition between the upper base region and the lower fastening region, a stopping surface, in particular of an annular shape, facing downwards, is formed, which forms a stopper for a stopping surface of a crock fastening extension fastening region; wherein the lower fastening region comprises on its outer surface at least two outer thread regions spaced apart from one another in the circumferential direction, and wherein the lower substantially cylindrical fastening region comprises, on its side facing down, a stopping face, in particular of an annular shape, which forms a stopper for a screw-in limiting surface of a screw-in limiting region.

11. A pharmacy formulation preparation crock, comprising:
   a pharmacy formulation preparation crock container having a cylindrical body and a moveable bottom plate; and
   a pharmacy formulation preparation crock lid according to claim 1, which is fastened to the pharmacy formulation preparation crock container, in particular screwed thereon.

12. A pharmacy formulation preparation device lifting arm for a pharmacy formulation preparation device for preparing an individual pharmaceutical product, wherein the pharmacy formulation preparation device lifting arm is adapted for quickly and detachably screw-fastening thereto a pharmacy formulation preparation crock lid, a pharmacy formulation preparation crock bottom, a pharmacy formulation preparation crock adapter, or a pharmacy formulation preparation crock according to claim 1,
   comprising:
   a substantially longitudinal basic body having a crock fastening extension fastening region for a fastening extension of a pharmacy formulation preparation crock lid, a pharmacy formulation preparation crock bottom, a pharmacy formulation preparation crock adapter or a pharmacy formulation preparation crock provided at or close to the longitudinal front end of the basic body;
   wherein the crock fastening extension fastening region is adapted as a recess extending from the lower side to the upper side of the basic body; and
   wherein the crock fastening extension fastening region comprises, on its inner surface, at least two inner thread regions spaced apart from one another in the circumferential direction.

13. The pharmacy formulation preparation device lifting arm according to claim 12, wherein the inner thread regions each comprise a plurality of thread walls arranged, in the axial direction, equidistantly on top of one another with the same inclination, and wherein the crock fastening extension fastening region has a substantially cylindrical form.

14. The pharmacy formulation preparation device lifting arm according to claim 12, further comprising a removal position indication pin extending from the lower side of the lifting arm downwards in the vertical direction; and wherein the removal position indication pin is provided radially close to the crock fastening extension fastening region such that, during the process of quick-fastening a crock lid or a crock bottom with the crock fastening extension fastening region, the removal position indication pin is arranged between the lid plate of the crock lid or the bottom plate of the crock bottom and the lower side of the pharmacy formulation preparation device lifting arm.

15. The pharmacy formulation preparation device lifting arm according to claim 12, wherein the crock fastening extension fastening region comprises an upper substantially cylindrical recess region and a lower substantially cylindrical recess region having a larger diameter, wherein at a transition between the lower and the upper substantially cylindrical recess region, a stopping surface, in particular of an annular shape, facing downwards is provided, which forms a stopper for a stopping surface of the fastening extension of the pharmacy formulation preparation crock lid, the pharmacy formulation preparation crock bottom or the pharmacy formulation preparation crock adapter; wherein the upper recess region comprises, on an inner surface, at least two inner thread regions spaced apart from one another in the circumferential direction, and wherein the crock fastening extension fastening region comprises, at the upper end of the upper substantially cylindrical recess region, a screw-in limiting region having a smaller inner diameter than the inner diameter of the inner thread region; and wherein the screw-in limiting region forms a screw-in limiting surface on its lower side towards the lower substantially cylindrical recess region; and wherein the screw-in limiting surface forms a stopper for the stopping surface of the fastening extension.

16. The pharmacy formulation preparation device lifting arm according to claim 12, further comprising a fastening claw having two claw extensions, the fastening claw comprising the crock fastening extension fastening region, which is formed as a recess extending from the lower side to the upper side of the basic body and extends from the longitudinal front end of the basic body to the crock fastening extension fastening region.

17. The pharmacy formulation preparation device lifting arm according to claim 16, wherein the recess of the agitating stick insertion region comprises two inner surfaces facing one another and having a substantially constant distance or a distance increasing to the front, and wherein a threadless inner surface intermediate region is each arranged between two inner thread regions spaced apart from one another in the circumferential direction.

18. The pharmacy formulation preparation device lifting arm according to claim 16, wherein, if a fastening claw is provided, a front inner thread region extends from each of the ends of the crock fastening extension fastening region circumferentially adjacent to the agitating stick insertion region, and wherein these front inner thread regions enclose two threadless inner surface intermediate regions and one rear inner thread region arranged opposite the agitating stick insertion region.

19. The pharmacy formulation preparation device lifting arm according to claim 12, comprising three inner thread regions spaced apart from one another in the circumferential direction and having threadless inner surface intermediate regions arranged therebetween.

20. The pharmacy formulation preparation device lifting arm according to claim 12, wherein the inner thread regions each take up an angle area of 30 to 90°, and wherein at least one of the inner thread regions comprises a circumferentially centered inner thread region section and two outer inner thread region sections circumferentially adjoining them on both sides in the circumferential direction, and wherein at least one thread wall in the circumferentially centered inner thread region section has a continuous height, measured radially to the curved plane of the inner surface of the crock fastening extension fastening region or to the thread bottom.

21. The pharmacy formulation preparation device lifting arm according to claim 12, wherein the height of the thread walls in the circumferentially outer inner thread region sections decreases, measured radially to the curved plane of the inner surface of the crock fastening extension fastening region or to the thread bottom, from the circumferentially inner end facing the center inner thread region section towards the circumferentially outer end of the respective outer inner thread region section and, in particular, decreases such that the circumferentially outer end of the respective outer inner thread region section transitions into the curved plane of the inner surface of the crock fastening extension fastening region, and that the height thereof, measured radially to the curved plane of the inner surface of the crock fastening extension fastening region, is zero.

* * * * *